US007222134B1

(12) United States Patent
Maruyama et al.

(10) Patent No.: US 7,222,134 B1
(45) Date of Patent: May 22, 2007

(54) FILING SYSTEM WHICH PROVIDES INCREASED AVAILABILITY OF IMAGE DATA STORED THEREIN

(75) Inventors: Teruyuki Maruyama, Kanagawa (JP); Masayoshi Miyamoto, Kanagawa (JP); Hiroshi Kakii, Tokyo (JP); Takashi Yoshikawa, Kanagawa (JP); Yuichi Araumi, Kanagawa (JP)

(73) Assignee: Ricoh Company, Ltd., Tokyo (JP)

( * ) Notice: Subject to any disclaimer, the term of this patent is extended or adjusted under 35 U.S.C. 154(b) by 0 days.

(21) Appl. No.: 09/407,768

(22) Filed: Sep. 29, 1999

(30) Foreign Application Priority Data

Sep. 30, 1998 (JP) ................................ 10-279019

(51) Int. Cl.
*G06F 17/30* (2006.01)

(52) U.S. Cl. .................. 707/201; 707/200; 707/205

(58) Field of Classification Search .................. 707/1, 707/102, 104.1, 200, 201, 500.1; 386/46, 386/95, 107; 382/140, 305; 348/231, 211, 348/222, 552, 150; 397/100.01, 100.17; 710/3, 8, 62
See application file for complete search history.

(56) References Cited

U.S. PATENT DOCUMENTS

| | | | |
|---|---|---|---|
| 5,602,936 A * | 2/1997 | Green et al. ................ 382/140 |
| 5,642,199 A | 6/1997 | Ukai et al. ................... 348/296 |
| 5,768,483 A * | 6/1998 | Maniwa et al. ............. 358/1.15 |
| 5,819,250 A * | 10/1998 | Trader et al. ................... 707/1 |
| 5,907,598 A * | 5/1999 | Mandalia et al. ...... 379/100.01 |
| 5,987,469 A * | 11/1999 | Lewis et al. ................ 707/102 |
| 6,167,469 A * | 12/2000 | Safai et al. .................... 710/62 |
| 6,208,379 B1 * | 3/2001 | Oya et al. ............... 348/211.11 |
| 6,337,712 B1 * | 1/2002 | Shiota et al. ............. 348/231.1 |
| 6,424,429 B1 * | 7/2002 | Takahashi et al. ......... 358/1.16 |
| 6,583,813 B1 * | 6/2003 | Enright et al. .............. 348/150 |
| 6,606,451 B2 * | 8/2003 | Honda et al. ................. 386/95 |
| 6,670,933 B1 * | 12/2003 | Yamazaki .................... 345/1.1 |
| 2001/0045983 A1 * | 11/2001 | Okazaki et al. ............. 348/211 |

FOREIGN PATENT DOCUMENTS

| | | |
|---|---|---|
| JP | 7-212602 | 8/1995 |
| JP | H05-119393 | 5/1997 |
| JP | H09-134319 | 5/1997 |
| JP | 10-154228 | 6/1998 |

OTHER PUBLICATIONS

Enright et al., U.S. Appl. No. 60/103,731, filed on Oct. 9, 1998.*

(Continued)

*Primary Examiner*—Neveen Abel-Jalil
(74) *Attorney, Agent, or Firm*—Oblon, Spivak, McClelland, Maier & Neustadt, P.C.

(57) ABSTRACT

In a filing system, a data processing apparatus is connected to a file server via a transmission path. Image data of a document is captured into the data processing apparatus. The captured image data is stored onto an image storage medium. A plurality of owner identifications are acquired when the image data is captured. The owner identifications are correlated with the image data stored on the image storage medium, and the stored image data is allowed to be accessed when any of the owner identifications correlated with the image data is verified. The image data is output in a readable manner by retrieving the stored image data of the image storage medium when the access to the image data is allowed.

21 Claims, 18 Drawing Sheets

OTHER PUBLICATIONS

U.S. Appl. No. 09/407,768, filed Sep. 29, 1999, Maruyama et al.

U.S. Appl. No. 10/915,437, filed Aug. 11, 2004, Maruyama.

U.S. Appl. No. 10/936,585, filed Sep. 9, 2004, Araumi et al.

U.S. Appl. No. 10/802,845, filed Mar. 18, 2004, Araumi.

U.S. Appl. No. 10/792,540, filed Mar. 4, 2004, Nakamura et al.

* cited by examiner

FILING SYSTEM WHICH PROVIDES INCREASED AVAILABILITY OF IMAGE DATA STORED THEREIN

BACKGROUND OF THE INVENTION (1) Field of the Invention

The present invention relates to a filing system including a data processing apparatus which captures image data, stores it on a storage device, transmits it to another data processing device, and copies it onto a copy sheet. The present invention also relates to a data processing method and a computer readable medium which are incorporated into the data processing apparatus in the filing system.

(2) Description of the Related Art

Recently, a number of centralized mainframe computers are shared by all users in an organization, and supplemented by workstations and personal computers located in departmental user rooms and private offices. With the increased number of machines has come the need to move data and files from one machine to another. A filing system is one approach to solving the file transfer problem. In the filing system, shared data is placed on a file server, and, when needed, individual machines are made to access data files located on the remote file server. This approach works well when the number of files that needs to be exchanged is not small.

In a conventional filing system, a data processing device (for example, a personal computer) is provided with a scanner, and the scanner captures image data by optically scanning the document to be copied or transmitted. However, when the number of documents that need to be exchanged between authorized users is large, the data capturing using the scanner becomes a considerably time-consuming task, and the access to the image data on the remote file server from the data processing device becomes a burdensome operation. This causes the delay of implementation of the conventional filing system. In addition, the contents of documents having confidential data, such as a password for the file access, may be revealed to the operator of the data processing device during the data capturing. The conventional filing system has such a problem of data security.

By taking account of the above-described problems, the inventors of the present invention have noted that image data of documents, which need to be stored in a filing system, are always first captured using scanners of copiers or facsimiles for corporate meeting uses or business purposes, and subsequently translated into usable signals using analog-to-digital converters. Hence, in order to eliminate the above-described problems, the inventors have designed a data processing apparatus and method, for use in the filing system, which creates identifications of the authorized users for such documents when the image data are first captured, and has the image data and the identifications stored on a storage medium of the filing system in a such a manner that the stored image data are subsequently accessible by the authorized users using the identifications. Further, the filing system must be designed to ensure security of the image data stored therein.

SUMMARY OF THE INVENTION

An object of the present invention is to provide a novel, useful filing system in which the above-described problems are eliminated.

Another object of the present invention is to provide a filing system which creates increased operability and availability of image data that is stored, reproduced, transmitted or retrieved for the authorized users only, while ensuring security of such image data in the filing system.

Another object of the present invention is to provide a data processing method which creates increased operability and availability of image data that is stored, reproduced, transmitted or retrieved for the authorized users only, while ensuring security of such image data.

Another object of the present invention is to provide a computer readable medium which creates increased operability and availability of image data that is stored, reproduced, transmitted or retrieved for the authorized users only, while ensuring security of such image data.

The above-mentioned objects of the present invention are achieved by a filing system in which at least one data processing apparatus is connected to a file server via a transmission path, the filing system including: a data capturing unit which captures image data of a document into the data processing apparatus; a data storing unit which stores the image data captured by the data capturing unit, onto an image storage medium; an authorized user identifying unit which acquires one or a plurality of owner identifications when the image data is captured by the data capturing unit; an access management unit which correlates the owner identifications with the image data stored by the data storing unit, and allows the stored image data to be accessed when any of the owner identifications correlated with the image data is verified; and a data output unit which outputs the image data in a readable manner by retrieving the stored image data of the image storage medium when the access to the image data is allowed by the access management unit.

The above-mentioned objects of the present invention are achieved by a data processing method for use in a data processing apparatus of a filing system, the data processing method including the steps of: capturing image data of a document into the data processing apparatus; storing the captured image data onto an image storage medium; acquiring one or a plurality of owner identifications when the image data is captured into the data processing apparatus; correlating the owner identifications with the image data stored on the image storage medium; allowing the stored image data to be accessed when any of the owner identifications correlated with the image data is verified; and outputting the image data in a readable manner by retrieving the stored image data of the image storage medium when the access to the image data is allowed.

The above-mentioned objects of the present invention are achieved by a computer readable medium storing program code for causing a processor to execute an authorized user identifying processing on a data processing apparatus, the computer readable medium including: a first program code device which causes the processor to capture image data of a document into the data processing apparatus; a second program code device which causes the processor to store the captured image data onto an image storage medium of the data processing apparatus; a third program code device which causes the processor to acquire one or a plurality of owner identifications when the image data is captured; a fourth program code device which causes the processor to correlate the owner identifications with the image data stored on the image storage medium, and causes the processor to allow the stored image data to be accessed when any of the owner identifications correlated with the image data is verified; and a fifth program code device which causes the processor to output the image data in a readable manner by retrieving the stored image data of the image storage medium when the access to the image data is allowed.

In the data processing apparatus and method in the filing system of the present invention, the identifications of the authorized users for the documents that need to be exchanged are created when the image data are first captured, and the image data and the identifications are stored together on the storage medium of the filing system in a such a manner that the stored image data are subsequently accessible by the authorized users using the identifications. The data processing apparatus and method in the filing system of the present invention are effective in providing increased operability and availability of image data that is stored, reproduced, transmitted or retrieved for the authorized users only, while ensuring security of such image data in the filing system.

BRIEF DESCRIPTION OF THE DRAWINGS

Other objects, features and advantages of the present invention will become more apparent from the following detailed description when read in conjunction with the accompanying drawings in which.

DETAILED DESCRIPTION OF THE PREFERRED EMBODIMENTS

A description will now be given of the preferred embodiments of the present invention with reference to the accompanying drawings.

Figure 1:
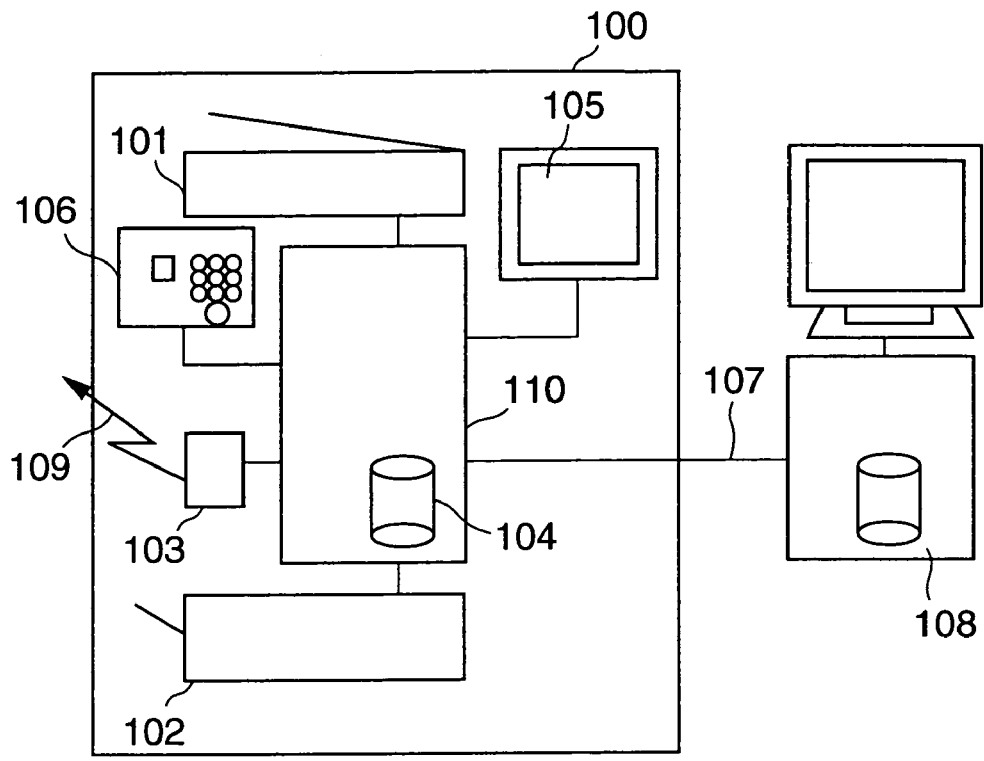
FIG. 1 is a block diagram of a first embodiment of the filing system of the present invention.

FIG. 1 shows a first embodiment of the filing system of the present invention.

In the filing system of FIG. 1, a data processing apparatus 100 and a file server 108 are interconnected by a transmission path 107. The transmission path 107 is, for example, an Ethernet cable, and a plurality of data processing apparatuses (or the clients) may be connected to the file server 108 via the transmission path 107. In the present embodiment, the data processing apparatuses and the file server interconnected together constitute a local area network or an Intranet. The data processing apparatus 100 acts as a backup system which stores image data handled by the user, and, when needed, it serves as a security system which allows only authorized users to access the stored image data.

As shown in FIG. 1, the data processing apparatus 100 includes a controller 110. A scanner 101, a printer 102, a communication control unit (CCU) 103, an image storage device 104, a touch panel 105, and a control keyboard 106 are connected to the controller 110. The scanner 101 captures image data by optically scanning a document to be copied or transmitted. The printer 102 records the captured or received data on a copy sheet and outputs the copy sheet. The CCU 103 is connected to a public switched telephone network (PSTN) via a communication line 109. When transmitting or receiving image data, the CCU 103 executes circuit switching procedures in order to connect the controller 110 to or disconnect the controller 110 from the PSTN via the communication line 109. The CCU 103 includes an internal modem unit and carries out facsimile transmission procedures through modulation and demodulation of image data and protocol signals performed by the modem unit. The image storage device 104 stores image data or image data files, which are captured or received, on a storage medium (for example, a magnetic disk). The touch panel 105 displays operational messages and inputs control indications. The control keyboard 106 inputs device driving conditions, device states, and user settings and commands.

In the data processing apparatus 100, the controller 110 includes a central processing unit (CPU), a read-only memory (ROM) and a random access memory (RAM). The CPU reads out a control program from the ROM, transfers it to the RAM, and then performs the overall system control processes for the elements 101–106 in accordance with the control program. The CPU controls the ROM so as to install device driving conditions and management data into the ROM.

In the present embodiment, each of control programs related to the flowcharts of FIG. 9A through FIG. 14 (which will be described later) is program code instructions stored in a memory of the data processing apparatus 100. The memory of the data processing apparatus 100 is, for example, the ROM of the controller 110. The memory corresponds to a computer readable medium in the claims. The computer readable medium includes any instruction storage device, such as, magnetic disks including floppy disks, optical disks including CD-ROMs, magneto-optical disks including MOs, semiconductor memory cards such as IC cards and miniature cards and other types of computer usable devices and media.

In the present embodiment, the memory of the data processing apparatus 100 may store encoded or non-encoded instructions. The instructions may be installed to the ROM of the controller 110 first, transferred to the RAM of the controller 110, and then read by the CPU (or the processor) of the controller 110. The memory of the data processing apparatus 100 may store either all or a part of the instructions related to the flowcharts of FIG. 9A through FIG. 14. Hereinafter, the CPU of the controller 110 of the data processing apparatus 100 will be called the processor for the sake of simplicity.

The data processing apparatus 100 has the copying function to record a captured image data onto a copy sheet by using the printer 102. The data processing apparatus 100 has the facsimile function to transmit or receive the image data via the PSTM by using the CCU 103. Further, the data processing apparatus 100 has the print function to record the image data, read from the image storage device 104, to a copy sheet by using the printer 102. The controller 110 of the data processing apparatus 100 controls the image storage device 104 so as to allow only the authorized users to access the image data or files of the image storage device 104. The data processing apparatus 100 transmits at a controlled time the stored image data to the file server 108 via the transmission path 107 so that the image data stored in the file server 108 can be accessed by the data processing apparatus 100.

Figure 2:
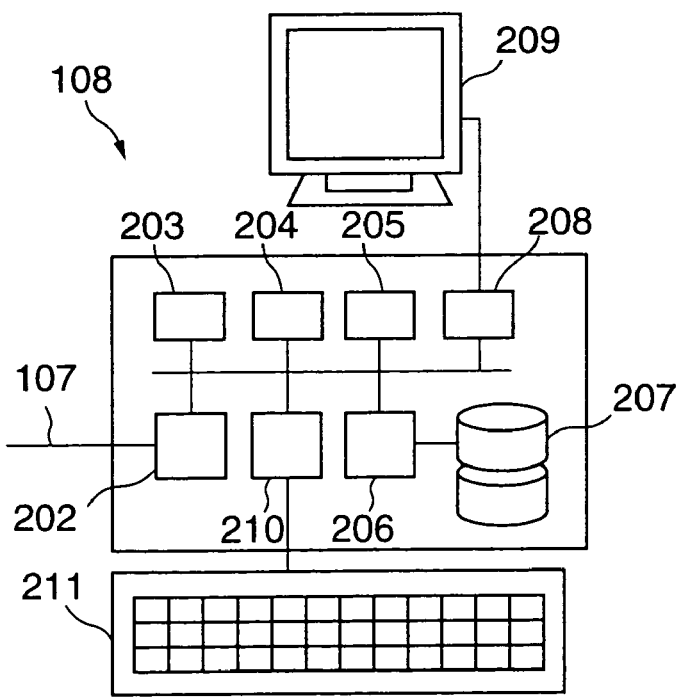
FIG. 2 is a block diagram of a file server device in the filing system of the present invention.

FIG. 2 shows a file server 108 in the filing system of the present invention. The file server 108 is constituted by a personal computer or a workstation. As shown in FIG. 2, the file server 108 includes a network interface 202, a CPU 203, a ROM 204, a RAM 205, a disk interface 206, a hard disk device 207, a display interface 208, a display 209, a keyboard interface 210, and a keyboard 211. The CPU 203 reads out an application program from the hard disk device 207, transfers it to the RAM 205, and then performs the overall system control processes on the elements 202 and 204–211 in accordance with the application program. The configuration and functions of the elements 202–211 of the file server 108 are essentially the same as those of a known file server, and a description thereof will be omitted unless otherwise specified.

In the file server 108 of FIG. 2, the transmission path 107 (the Ethernet cable) is connected to the network interface 202. As described above, the data processing apparatuses (or the clients) and the file server interconnected together constitute the local area network. When needed, the controller 110 of the data processing apparatus 100 transmits the image data to the file server 108 via the transmission path 107, and the file server 108 receives the image data through the network interface 202, and the image data is stored on the hard disk device 207. In this manner, the data processing apparatus 100 and the file server 108, in the filing system, store the image data, which is captured or 9 received, onto the image storage device 104 or the hard disk device 207, and exchange the stored image data in an interactive manner.

Figure 3:
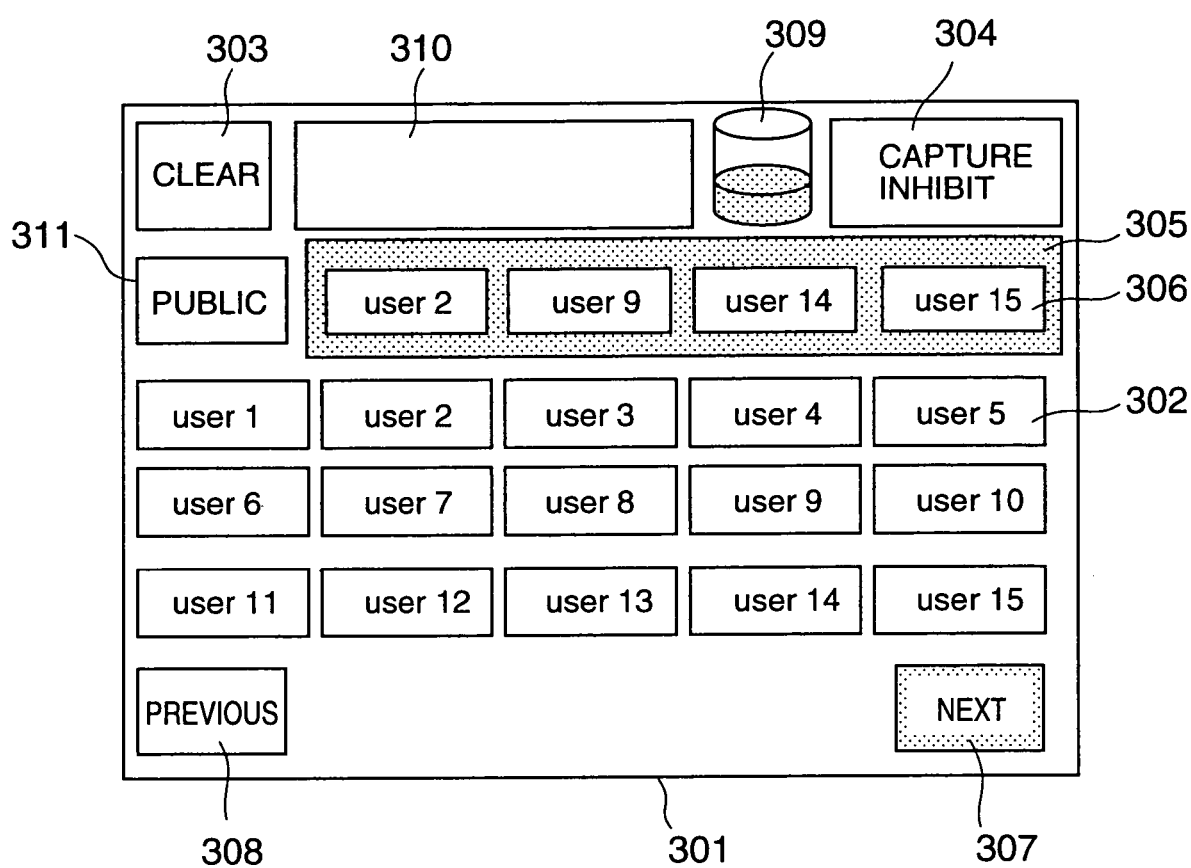
FIG. 3 is a diagram showing an initial page on a touch panel of a data processing apparatus in the filing system.
Figure 4:
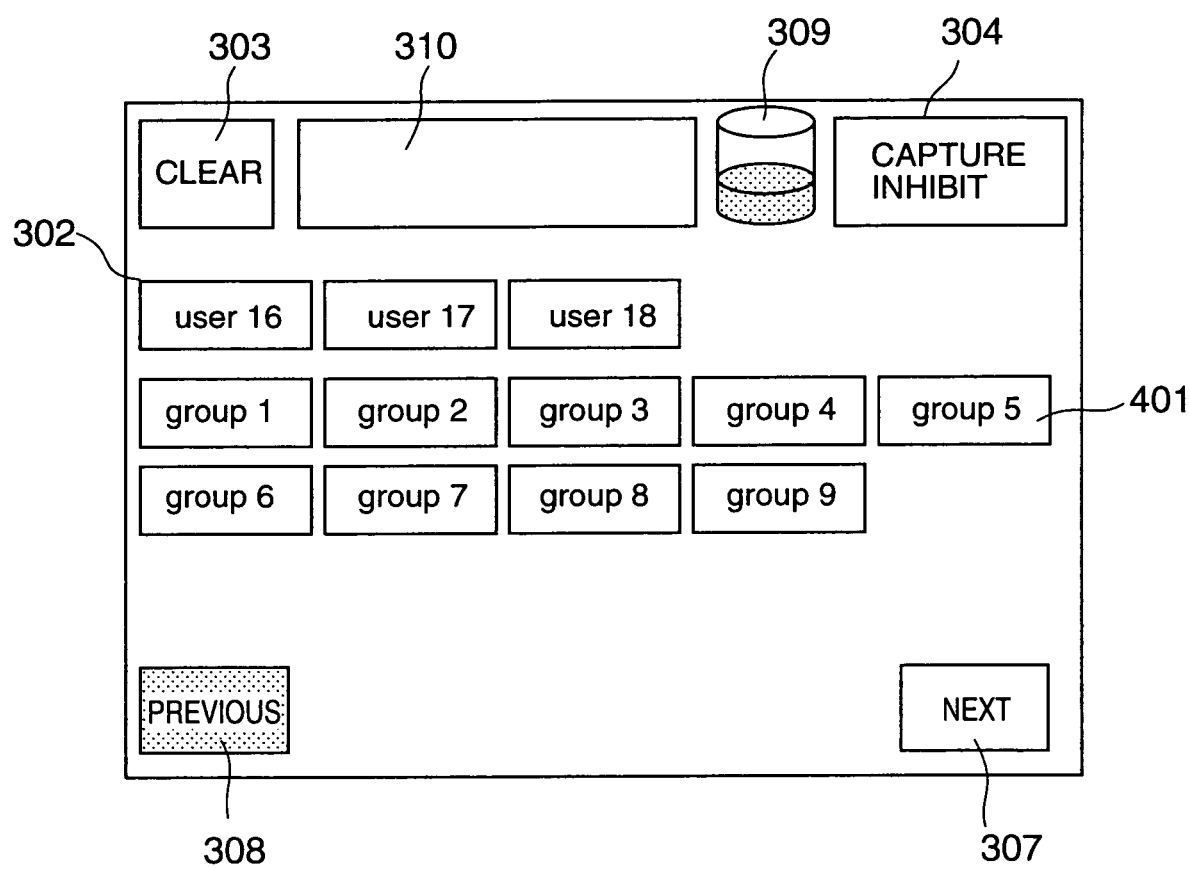
FIG. 4 is a diagram showing a next page on the touch panel.

FIG. 3 shows an initial page displayed on the touch panel 105 of the data processing apparatus 100 in the filing system. FIG. 4 shows a next page displayed on the touch panel 105.

In the present embodiment, one of the two pages is selectively displayed on the touch panel 105. However, the number of pages displayed on the touch panel 105 for the purpose of authorized user ID acquisition according to the present invention is not limited to two. Alternatively, only one page, or three or more pages may be displayed on the touch panel 105. It is necessary that one or more authorized user ID acquisition pages be displayed on the touch panel 105 wherein the identifications of authorized users can be easily recognized and any of the identifications can be easily selected.

As shown in FIG. 3 and FIG. 4, there are displayed on the touch panel 105 a number of user selection buttons 302, a clear button 303, a capture-inhibit button 304, an input-history indication region 305 with frequent selection user buttons 306, a next button 307, a previous button 308, an available-disk-space indication region 309, a message indication region 310, a public-mode button 311, and a number of group selection buttons 401. In the present embodiment, when the next button 307 on the initial page of the touch panel 105 shown in FIG. 3 is depressed, the next page shown in FIG. 4 appears on the touch panel 105. When the previous button 308 on the next page of the touch panel 105 shown in FIG. 4 is depressed, the initial page shown in FIG. 3 appears on the touch panel 105.

The data processing apparatus 100 is configured such that the image data stored on the image storage device 104, after the image data of the document was captured and then it was copied or transmitted, is exchanged between the authorized users. The access to the stored image data is allowed only for the authorized users. A plurality of authorized user identifications (which will be called the user IDs) related to the data processing apparatus 100 are predetermined for the purpose of the authorized user ID acquisition according to the present invention.

Hereinafter, the authorized users are classified into two categories: operators who actually use the data processing apparatus 100 to process the image data to be copied or transmitted; and owners who are authorized to access the image data because of their job responsibilities. Similarly, a plurality of operator identifications (which will be called the operator IDs) and a plurality of owner identifications (which will be called the owner IDs) are also predetermined in a discrete manner for the purpose of the authorized user ID acquisition according to the present invention. The operator IDs are used to determine who receive the copies at the time of copying or transmitting the document, while the owner IDs are used to determine who need to subsequently access the stored image data after the copying or the facsimile transmission. Further, a plurality of group identifications (which will be called the group IDs) are predetermined for the purpose of group ID acquisition according to the present invention. The group IDs are used to determine which of departmental groups of an organization receives the copies or needs to subsequently access the stored image data after the copying or the facsimile transmission.

As shown in FIG. 3, the user IDs (which are either the owner IDs or the operator IDs) are respectively assigned to the user selection buttons 302. Suppose that a power switch of the data processing apparatus 100 is turned ON and the data processing apparatus 100 is now operating. When any of the user selection buttons 302 of the touch panel 105 shown in FIG. 3 are depressed or touched by the operator, the controller 110 acquires corresponding ones of the user IDs (the owner IDs or the operator IDs) for the ON-state (depressed) user selection buttons. The controller 110 correlates the user IDs (the owner IDs or the operator IDs) with the image data which is captured from the document and stored onto the image storage device 104, and allows the stored image data to be accessed when any of the user IDs correlated with the image data is verified.

In the present embodiment, the authorized user identifications (the user IDs) of the user selection buttons 302 are arrayed in alphabetical order on the touch panel 105 as shown in FIG. 3.

The frequent selection buttons 306 of the input history indication region 305 shown in FIG. 3 indicate a list of the owner IDs which have the four highest frequencies of selection of such authorized users among all the owners related to the data processing apparatus 100. In the present embodiment, when any of the frequently selected user buttons 306 of the touch panel 105 are depressed or touched by the operator, the controller 110 acquires corresponding ones of the owner IDs for the ON-state (depressed) user buttons 306. The controller 110 correlates the owner IDs with the image data which is captured from the document and stored onto the image storage device 104, and allows the stored image data to be accessed when any of the owner IDs correlated with the image data is verified.

In the touch panel 105 of the present embodiment, the user selection buttons 302 and the frequently selected user buttons 306 are displayed in different colors so that they are easily distinguished from each other.

The group selection buttons 401 shown in FIG. 4 are to display the group IDs each indicative of a departmental group to which the users related to the data processing apparatus 100 belong. In the present embodiment, when any of the group selection buttons 401 of the touch panel 105 are depressed, the controller 110 acquires corresponding ones of the group IDs for the ON-state (depressed) group selection buttons 401. The controller 110 correlates the group IDs with the image data which is captured from the document and stored onto the image storage device 104, and allows the stored image data to be accessed when any of the group IDs correlated with the image data is verified. In this context, the group ID acquisition is the same meaning as the owner ID acquisition from the point of view of the controller 110.

Figure 5:
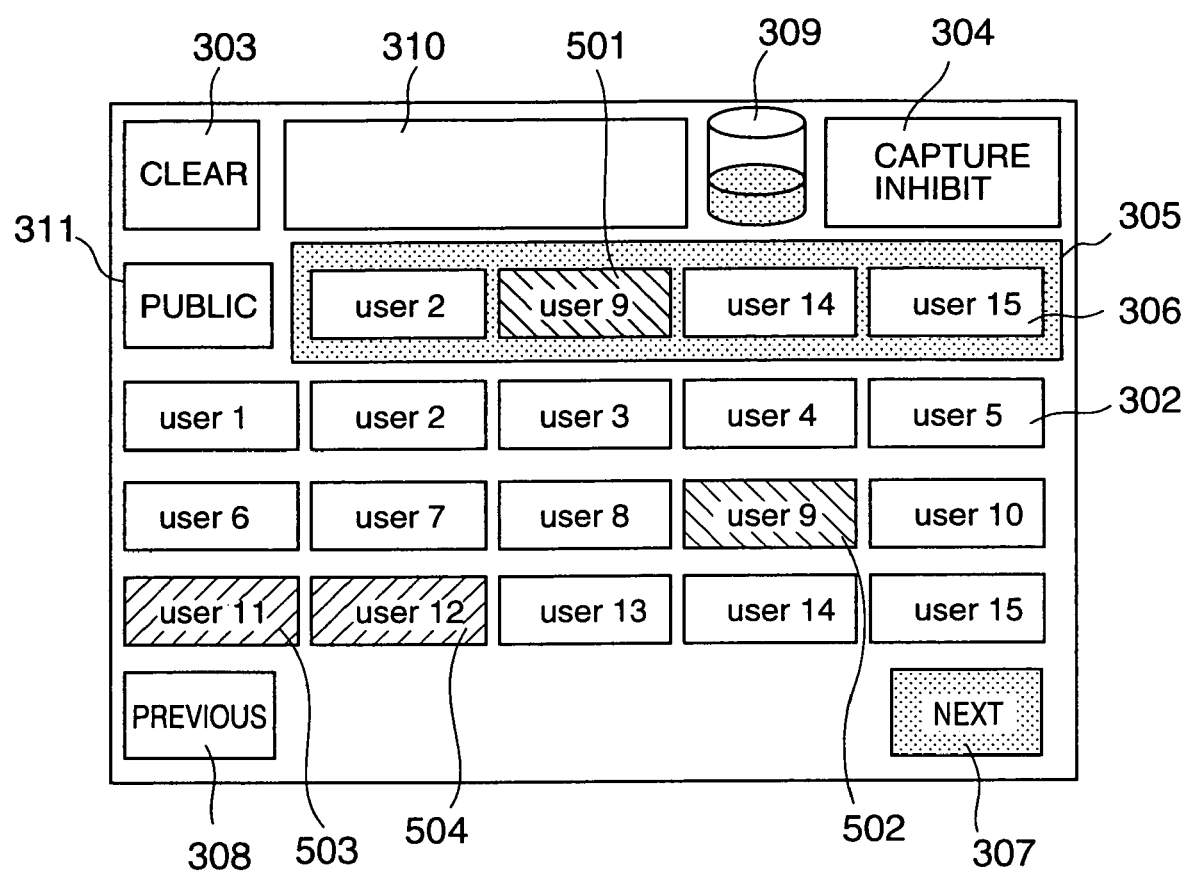
FIG. 5 is a diagram showing a user selected condition of the initial page on the touch panel.
Figure 6:
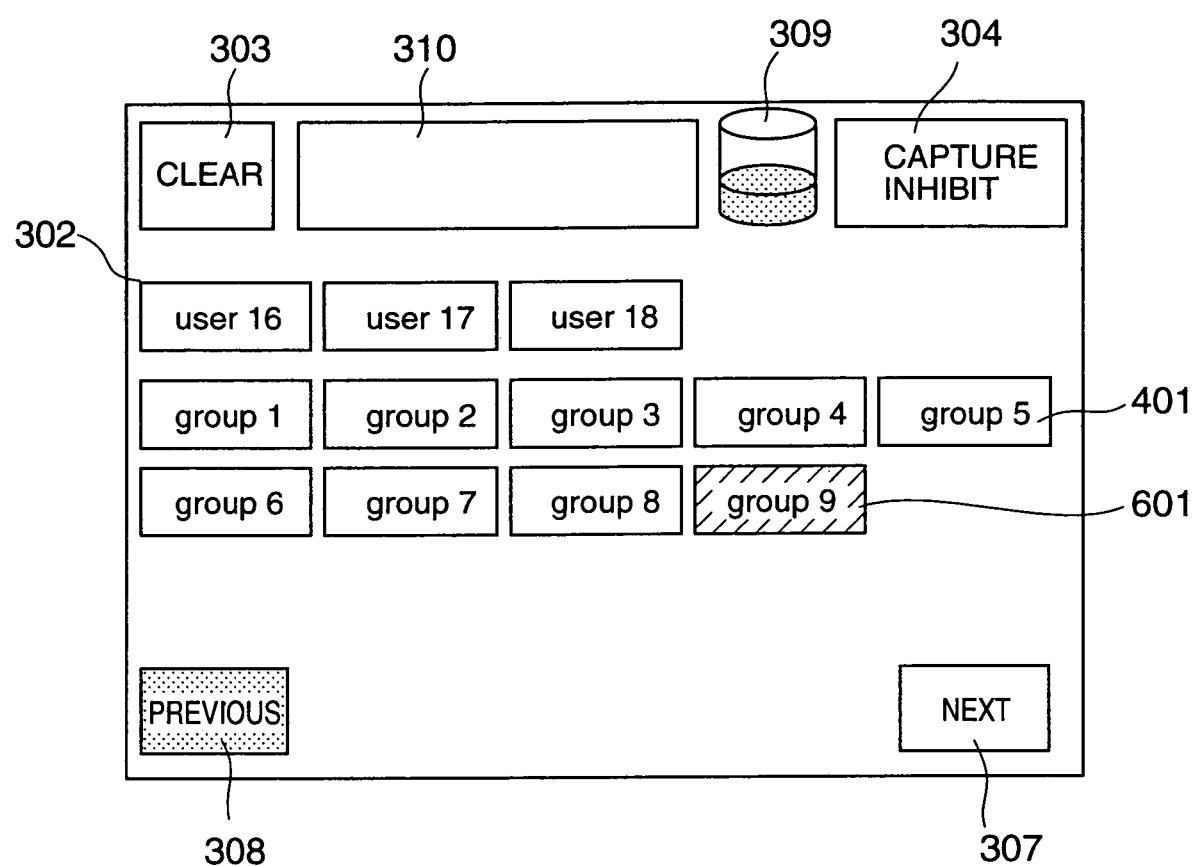
FIG. 6 is a diagram showing a group selected condition of the next page on the touch panel.

FIG. 5 shows a user selected condition of the initial page on the touch panel 105. FIG. 6 shows a group selected condition of the next page on the touch panel 105.

The user selected condition of FIG. 5 occurs when a "user 9" button 501 (or 502) on the initial page of FIG. 3 is first depressed for the operator ID selection of the "user 9", and then a "user 11" button 503 and a "user 12" button 504 on the initial page of FIG. 3 are subsequently depressed for the owner ID selection of the "user 11" and the "user 12".

As shown in FIG. 5, the user 9 button 501 is included in the input-history indication region 305 and the user 9 button 502 is one of the user selection buttons 302. In this case, when either the button 501 or the button 502 is depressed at the first attempt, the operator ID (the user 9) is selected and the controller 110 acquires it. At the same time, both the display colors of the buttons 501 and 502 on the touch panel 105 are changed to a separate color that is indicative of the operator ID selection.

When the user 11 button 503 and the user 12 button 504 are depressed at the second attempt, the owner IDs (the user 11 and the user 12) are selected and the controller 110 acquires them. At the same time, both the display colors of the buttons 503 and 504 on the touch panel 105 are changed to a separate color that is indicative of the owner ID selection.

The group selected condition of FIG. 6 occurs when a "group 9" button 601 on the next page of FIG. 4 is depressed for the owner ID selection of the "group 9". The owner ID (the group 9) is selected and the controller 110 acquires it. At the same time, the display color of the button 601 on the touch panel 105 is changed to the separate color indicative of the owner ID selection.

In the present embodiment, whether the operator ID acquisition or the owner ID acquisition is performed by the controller 110 depends on the sequence of the user selection attempts on the touch panel 105. When any of the selection buttons 302 and 306 are depressed at the first attempt, one or a plurality of the operator IDs corresponding to the depressed buttons are acquired by the controller 110, and when any of the selection buttons 302 and 401 are depressed at the second attempt, one or a plurality of the owner IDs corresponding to the depressed buttons are acquired by the controller 110. However, the present invention is not limited to this embodiment. Alternatively, the owner ID acquisition may be performed for the first attempt of the user selection and the operator ID acquisition may be performed for the second attempt.

In the user selected condition of FIG. 5, when, for example, the user 11 button 503 is depressed again, the owner ID acquisition of the user 11 is canceled and the display color of the button 503 is returned to the original color. In the group selected condition of FIG. 6, when the group 9 button 601 is depressed again, the owner ID acquisition of the group 9 is canceled, and the display color of the button 601 on the touch panel 105 is returned to the original color.

Figure 7:
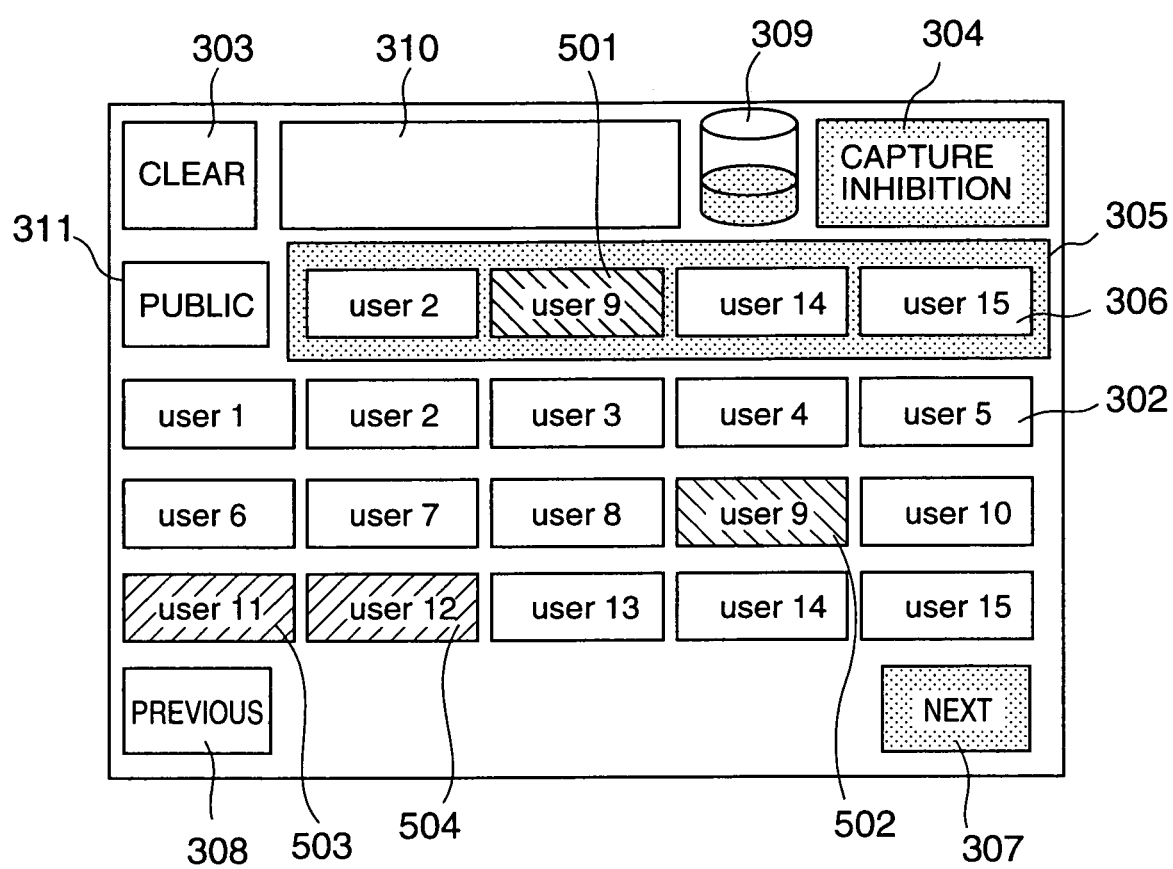
FIG. 7 is a diagram showing a capture inhibition condition of the initial page on the touch panel.

FIG. 7 shows a capture inhibition condition of the initial page on the touch panel 105.

The capture inhibition condition of FIG. 7 occurs when the capture-inhibit button 304 on the initial page of the touch panel 105 of FIG. 3 is depressed. When the capture-inhibit button 304 is depressed, the controller 110 detects the depression of this button 304 and acquires a capture-inhibition identification. By this capture-inhibition identification, the controller 110 inhibits the scanner 101 from capturing image data by optically scanning a document. The image storage device 104 no longer stores the image data supplied by the scanner 101, onto the storage medium.

When the capture-inhibit button 304 is depressed, the display color of the button 304 on the touch panel 105 is changed to a different color that is indicative of the capture inhibition condition as shown in FIG. 7. When the capture-inhibit button 304 is depressed again, the data processing apparatus 100 is changed from the capture inhibition condition into the initial condition, so that the image storage device 104 is allowed to store the image data supplied by the scanner 101, onto the storage medium. The display color of the button 304 in this case is returned to the initial color.

Figure 8:
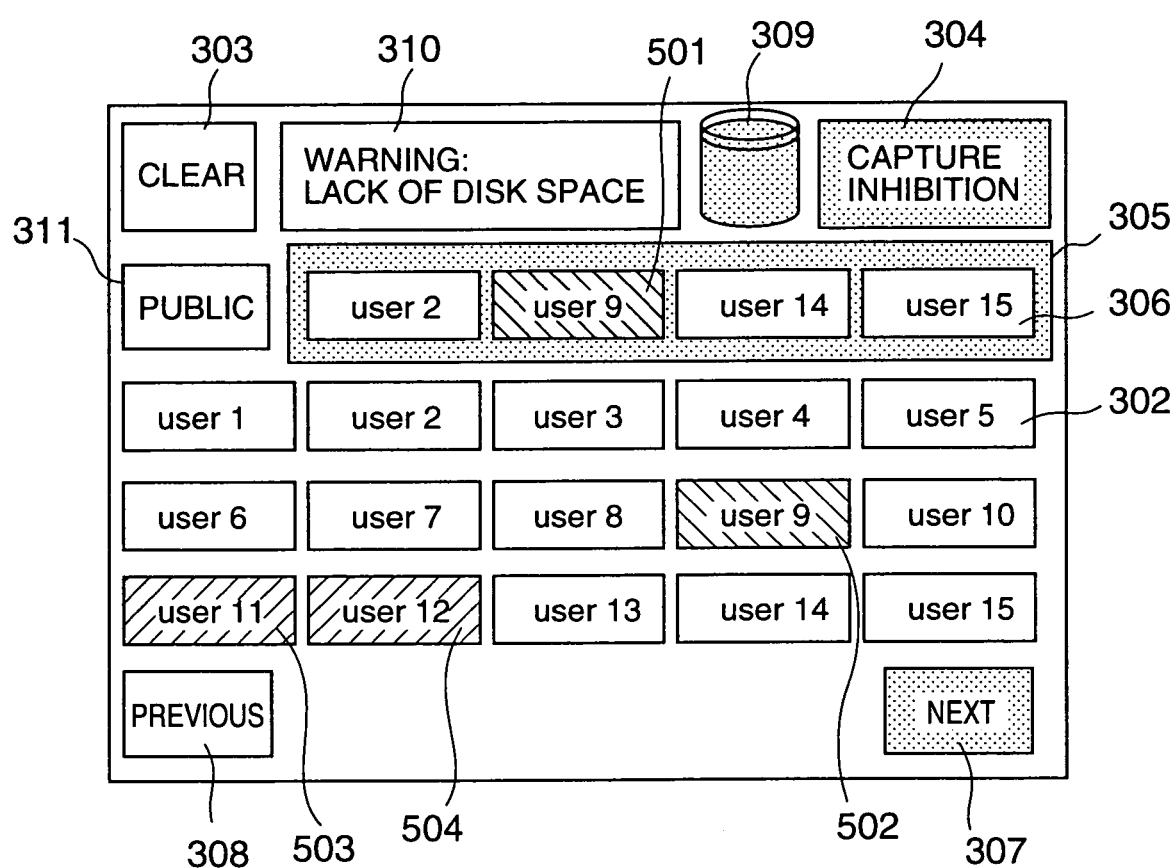
FIG. 8 is a diagram showing a warning message in the initial page on the touch panel.

FIG. 8 shows a warning message in the initial page on the touch panel 105.

As shown in FIG. 8, the available-disk-space indication region 309 on the touch panel 105 indicates the amount of available storage of the image storage device 104 in a diagram form. When the amount of available storage of the image storage device 104 is below a lower limit, a warning message that indicates lack of the available storage of the image storage device 104 appears in the message indication region 310 of the touch panel 105.

In the present embodiment, the controller 110 monitors the amount of the available storage of the image storage device 104 and controls the touch panel 105 so as to display it in the available-disk-space indication region 309. When the amount of the available storage of the image storage device 104 is above the lower limit, the controller 110 allows the image storage device 104 to store the image data, supplied by the scanner 101, onto the storage medium (the magnetic disk). When the amount of the available storage of the image storage device 104 is below the lower limit, the controller 110 controls the touch panel 105 to display the warning message in the message indication region 310, and inhibits the image storage device 104 from storing the image data onto the storage medium. After the warning message is displayed, the controller 110 controls the CCU 103 so as to transmit the image data, supplied by the scanner 101, to the file server 108 via the transmission path 107.

In the above-described embodiment, the image data is transmitted from the data processing apparatus 100 to the file server 108 when the amount of the available storage of the image storage device 104 is below the lower limit. However, the present invention is not limited to this embodiment. For example, the transmission of the image data to the file server 108 may be performed by the data processing apparatus 100 every day at a regular time.

The public-mode button 311 on the initial page of the touch panel 105 inputs a public-mode identification to the controller 110 when the button 311 is depressed. The controller 110 acquires the public mode identification when the image data is captured by the scanner 101. The controller 110 correlates the public-mode identification with the image data which is captured from the document and stored onto the image storage device 104, and allows the stored image data to be accessed by all the authorized users when the public-mode identification correlated with the image data is acquired.

The clear button 303 on the touch panel 105 inputs an initialization command to the controller 110 when the button 303 is depressed. The controller 110 detects the initialization command before the image data is captured by the scanner 101. The controller 110 initializes the acquired owner identifications (or the acquired operator identifications or the public-mode identification) on the RAM into initial values when the initialize command is detected.

As described above, the next button 307 on the initial page of the touch panel 105 instructs the controller 110 to display the next page on the touch panel 105. The previous button 308 on the next page of the touch panel 105 instructs the controller 110 to display the initial page on the touch panel 105.

Figure 9A:
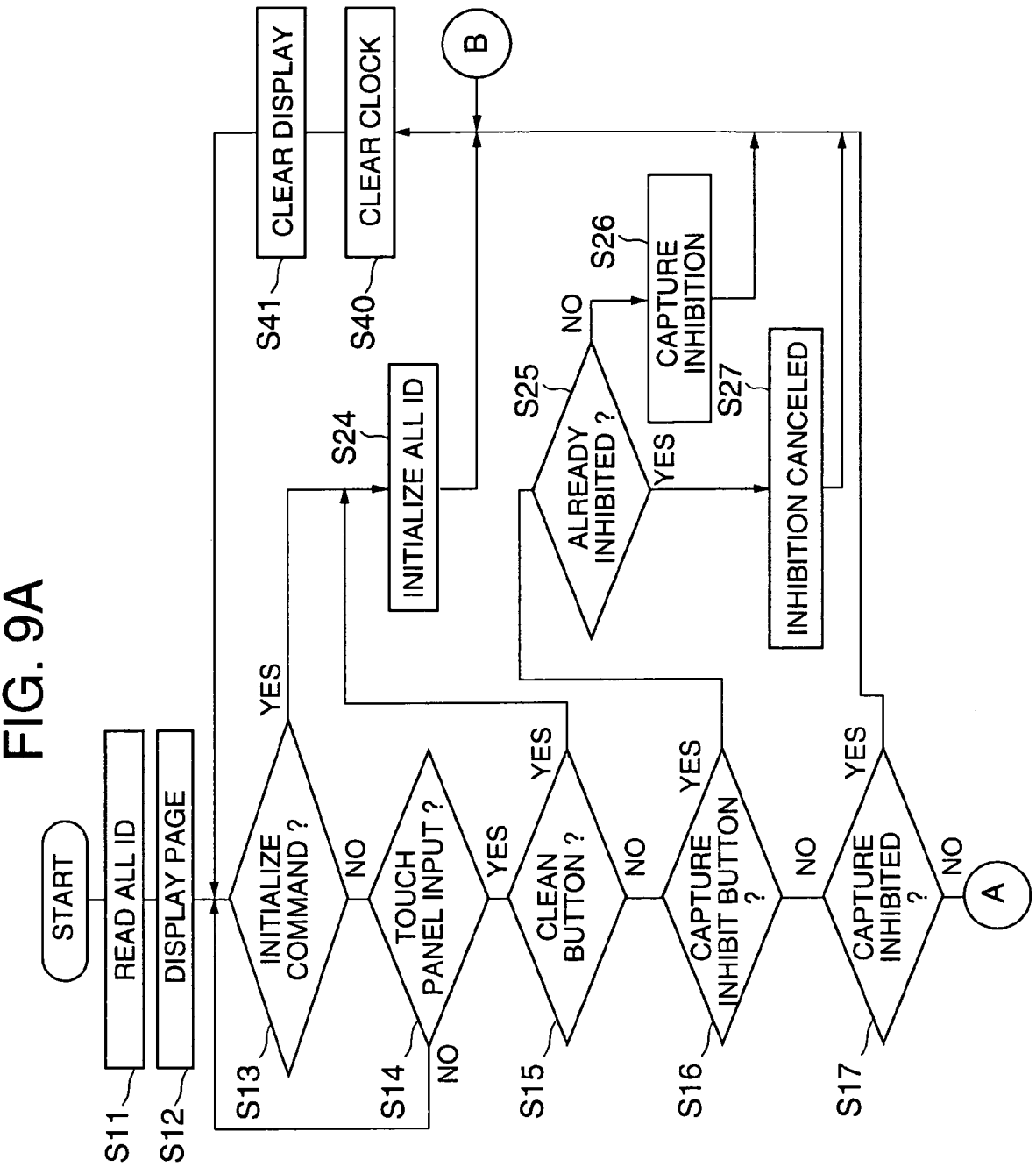
FIG. 9A and FIG. 9B are a flowchart for explaining a user ID acquisition process carried out by a controller of the filing system.
Figure 9B:
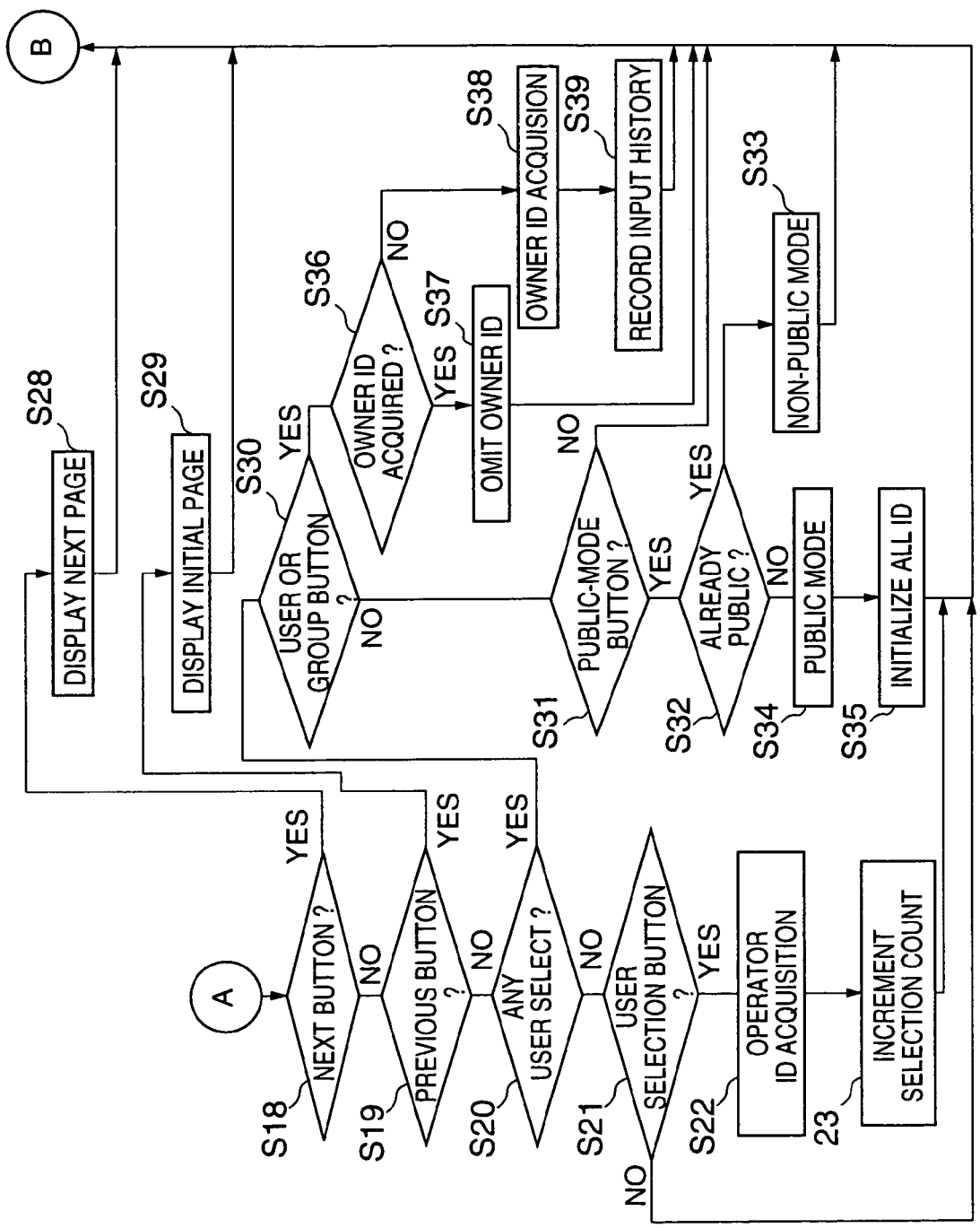

FIG. 9A and FIG. 9B show a user ID acquisition process carried out by the controller 110 of the data processing apparatus 100 in the filing system of FIG. 1.

The user ID acquisition process of FIG. 9A and FIG. 9B is performed within an initial setting routine which is started when the power switch of the data processing apparatus 100 is turned ON. Hereinafter, the CPU of the controller 110 is referred to as the processor.

At the start of the user ID acquisition process of FIG. 9A, step S11 causes the processor to read out all the user IDs and the group IDs from a user information file of the image storage device 104 so that they are transferred to the RAM of the controller 110. In the present embodiment, this user information file is stored, in advance, on the image storage device 104, and all the user IDs, the group IDs and other matters which are predetermined with respect to the data processing apparatus 100 are contained in the user information file.

After the step S11 is performed, step S12 causes the processor to display a number of sets of indication areas of the touch panel 105 based on the users IDs and the group IDs read out at the step S11. The user selection buttons 302 are displayed on the touch panel 105 in a sequence of the authorized user identifications being defined in the user information file. Step S13 causes the processor to determine whether an initialize command is detected by the processor. The processor (the CPU of the controller 110) includes a clock which measures an elapsed time from a start of operation of the data processing apparatus 100, and the initialize command is transmitted to the processor when the elapsed time measured by the clock exceeds a predetermined reference period. In addition, when the entire data processing on the data processing apparatus 100 is terminated, the initialize command is transmitted to the processor.

When the result at the step S13 is affirmative (or when the initialize command is detected), step S24 causes the processor to initialize all the user IDs, the group IDs and the other matters on the RAM into initial values. After the step S24 is performed, step S40 causes the processor to initialize or clear the measurement of the clock, and step S41 causes the processor to initialize the displayed indication areas of the touch panel 105 into the initial condition. After the step S41 is performed, the control of the processor is transferred to the step S13.

When the result at the step S13 is negative (or when the initialize command is not detected), step S14 causes the processor to determine whether any input is given onto the touch panel 105. When the result at the step S14 is affirmative, step S15 is performed. Otherwise the control of the processor is transferred to the step S13.

Step S15 causes the processor to determines whether the clear button 303 on the touch panel 105 is depressed. When the clear button 303 is depressed, the control of the processor is transferred to the above steps S24, S40 and S41, so that all the user IDs, the group IDs and the other matters on the RAM are initialized, the measurement of the clock is cleared, and the displayed indication areas of the touch panel 105 is cleared. Otherwise step S16 causes the processor to determine whether the capture-inhibit button 304 is depressed.

When the capture-inhibit button 304 is depressed at the step S16, step S25 causes the processor to determine whether the capture inhibition condition already occurs on the data processing apparatus 100. When the result at the step S25 is negative, step S26 causes the processor to inhibit the scanner 101 from capturing the image data, and the data processing apparatus 100 is set in the capture inhibition condition. When the result at the step S26 is affirmative, step S27 causes the processor to cancel the capture inhibition condition. In the latter case, the processor allows the scanner 101 to capture the image-data, and the data processing apparatus 100 is returned to the initial condition. After the step S26 or the step S27 is performed, the control of the processor is transferred to the above steps S40 and S41.

When the capture-inhibit button 304 is not depressed at the step S16, step S17 causes the processor to determine whether the capture inhibition condition already occurs on the data processing apparatus 100. When the result at the step S17 is affirmative, the control of the processor is transferred to the above steps S40 and S41. Otherwise the control of the processor is transferred to step S18 shown in FIG. 9B.

As shown in FIG. 9B, step S18 causes the processor to determine whether the next button 307 is depressed. When the next button 307 is depressed, step S28 causes the processor to display the next page on the touch panel 105 as shown in FIG. 4. After the step S28 is performed, the control of the processor is transferred to the above steps S40 and S41. When the next button 307 is not depressed, step S19 causes the processor to determine whether the previous button 308 is depressed. When the previous button 308 is depressed at the step S19, step S29 causes the processor to display the initial page on the touch panel 105 as shown in FIG. 3. After the step S29 is performed, the control of the processor is transferred to the above steps S40 and S41.

When the previous button 308 is not depressed at the step S19, step S20 causes the processor to determine whether any user ID acquisition is already performed. When the result at the step S20 is negative (or when the user ID is selected for the first time), step S21 causes the processor to determine whether the user selection buttons 302 on the touch panel 105 are depressed. When the user selection buttons 302 are not depressed, the control of the processor is transferred to the above steps S40 and S41. When any of the user selection buttons 302 are depressed, step S22 causes the processor to acquire one or a plurality of the operator IDs corresponding to the depressed user selection buttons 302. After the step S22 is performed, step S23 causes the processor to increment a user selection count on the RAM for each of the acquired operator IDs. That is, the processor records the latest user selection counts (the input history) of the operator IDs to the RAM. After the step S23 is performed, the control of the processor is transferred to the above steps S40 and S41.

When any user ID acquisition is already performed (or when the user ID is subsequently selected) at the step S20, step S30 causes the processor to determine whether the user selection buttons 302 or the group selection buttons 401 on the touch panel 105 are depressed. When the selection buttons 302 or 401 are depressed at the step S30, step S36 causes the processor to determine whether the owner IDs (one or a plurality of the owner IDs) corresponding to the depressed selection buttons 302 or 401 are already acquired. When the owner IDs are already acquired at the step S36, step S37 causes the processor to omit the owner IDs from the owner ID acquisition. When the owner IDs are not yet acquired (or when the owner IDs are selected for the first time) at the step S36, step S38 causes the processor to acquire the owner IDs (one or a plurality of the owner IDs) corresponding to the depressed selection buttons 302 or 401. After the step S38 is performed, step S39 causes the processor to increment a user selection count on the RAM for each of the acquired owner IDs. That is, the processor records the latest user selection counts (the input history) of the owner IDs to the RAM at the step S39. After the step S37 or the step S39 is performed, the control of the processor is transferred to the above steps S40 and S41.

When none of the selection buttons 302 and 401 are depressed at the step S30, step S31 causes the processor to determine whether the public-mode button 311 on the touch panel 105 is depressed. When the public-mode button 311 is not depressed, the control of the processor is transferred to the above steps S40 and S41. When the public-mode button 311 is depressed, step S32 causes the processor to determine whether the public mode ID is already acquired. When the result at the step S32 is affirmative (or when the button 311 is subsequently depressed), step S33 causes the processor to cancel the acquired public mode ID on the RAM so that the captured image data is not correlated with the public mode ID (the non-public mode).

When the result at the step S32 is negative (or when the button 311 is depressed for the first time), step S34 causes the processor to acquire the public mode ID so that the captured image data is correlated with the public mode ID, and all the authorized users are allowed to access the stored image data (the public mode). After the step S34 is performed, step S35 causes the processor to initialize all the user IDs, the group IDs and the other matters on the RAM into the initial values. After the step S33 or the step S35 is performed, the control of the processor is transferred to the above steps S40 and S41.

As described above, in the user ID acquisition process of FIG. 9A and FIG. 9B, when any of the selection buttons 302 and 306 are depressed at the first attempt, one or a plurality of the operator IDs corresponding to the depressed buttons are acquired by the controller 110, and when any of the selection buttons 302 and 401 are depressed at the second attempt, one or a plurality of the owner IDs corresponding to the depressed buttons are acquired by the controller 110. When the initialize command is detected upon the time-over event, the clear button depression or the entire data processing end, all the user IDs, the group IDs and the other matters on the RAM are initialized by the controller 110.

Figure 10:
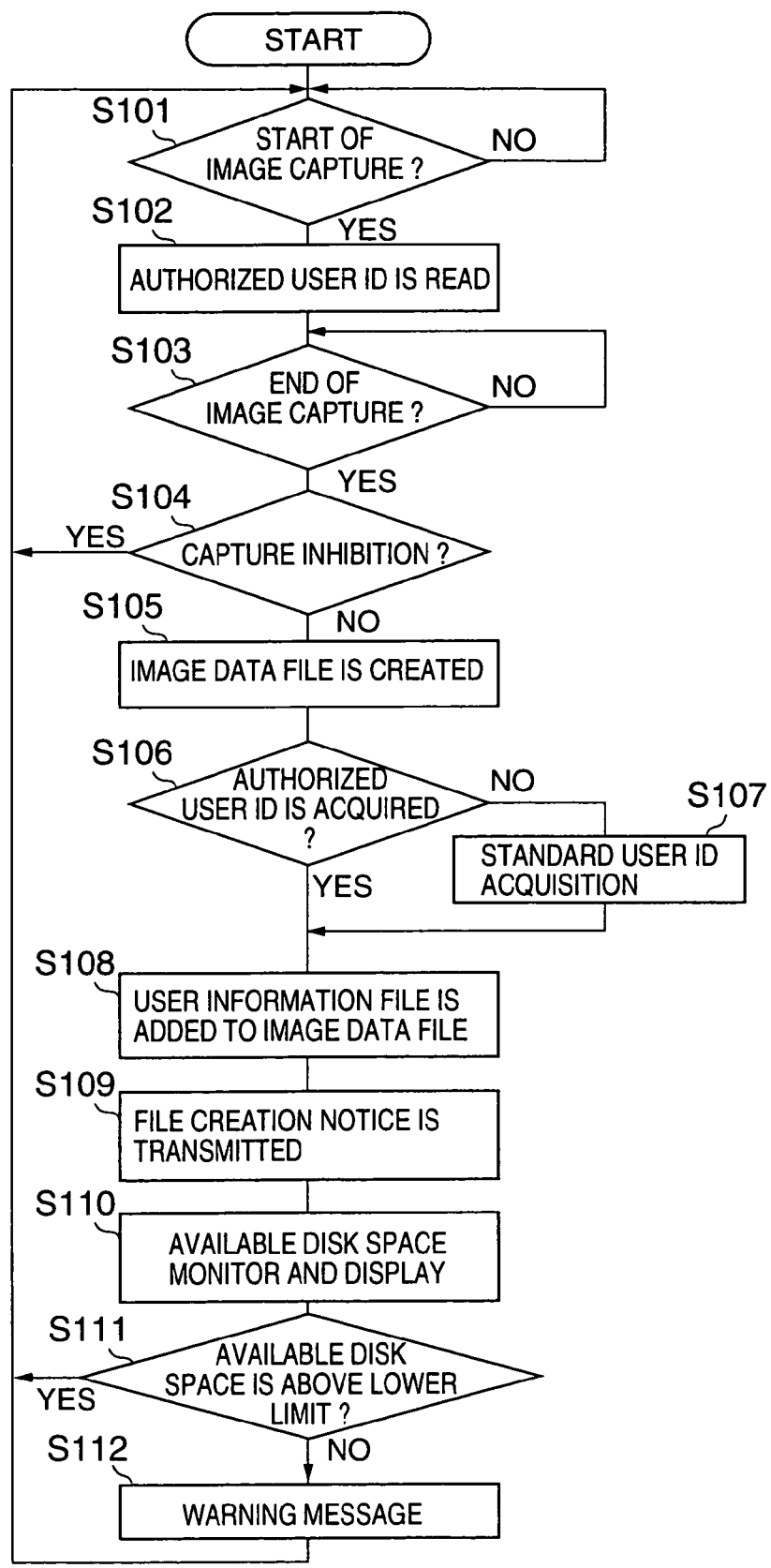
FIG. 10 is a flowchart for explaining an image data capture process carried out by the controller of the filing system.

FIG. 10 shows an image data capture process carried out by the controller 110 of the filing system of FIG. 1.

The image data capture process of FIG. 10 is performed in parallel with the user ID acquisition process of FIG. 9A and FIG. 9B, and the execution thereof is started immediately before the start of the copy, facsimile or print processing of the data processing apparatus 100. Hereinafter, the CPU of the controller 110 is referred to as the processor.

As shown in FIG. 10, at the start of the image data capture process, step S101 causes the processor to determine whether a start of the image data capturing of the scanner 101 is detected. When the result at the step S101 is negative, the processor repeats performing the step S101. When the result at the step S101 is affirmative, step S102 causes the processor to read the authorized user IDs from the results of the user ID acquisition process of FIG. 9A and FIG. 9B.

After the step S102 is performed, step S103 causes the processor to determine whether an end of the image data capturing by the scanner 101 is detected. When the result at the step S103 is negative, the processor repeats performing the step S103. When the result at the step S103 is affirmative, step S104 causes the processor to determine whether the capture-inhibition identification is detected. When the result at the step S104 is affirmative, the control of the processor is transferred to the above step S101.

When the result at the step S104 is negative, step S105 causes the processor to create an image data file on the image storage device 104 based on the acquired image data. After the step S105 is performed, step S106 causes the processor to determine whether the authorized user IDs are acquired. When the result at the step S106 is negative, step S107 causes the processor to acquire a standard user ID (the default setting data) as the operator ID. After the step S107 is performed, the control of the processor is transferred to step S108.

When the result at the step S106 is affirmative, step S108 causes the processor to add the user information file to the image data file. The user information file is created based on all the authorized user IDs (the user IDs and the group IDs). After the step S108 is performed, step S109 causes the processor to transmit a file creation notice to an image data transmission control program (which will be described later with reference to FIG. 11). After the step S109 is performed, step S110 causes the processor to monitor the amount of the available storage of the image storage device 104 and display it in the available-disk-space indication region 309 on the touch panel 105.

After the step S110 is performed, step S111 causes the processor to determine whether the amount of the available storage of the image storage device 104 is above the lower limit. When the result at the step S111 is affirmative, the control of the processor is transferred to the step S101. In this case, the controller 110 allows the image storage device 104 to store the image data, supplied by the scanner 101, onto the storage medium of the image storage device 104. On the other hand, when the result at the step S111 is negative (the amount of the available storage of the image storage device 104 is below the lower limit), step S112 causes the processor to display the above-described warning message in the message indication region 310 on the touch panel 105. After the step S112 is performed, the control of the processor is transferred to the step S101. In this case, the controller 110 inhibits the image storage device 104 from storing the image data onto the storage medium of the image storage device 104.

When the above-described image data capture process of FIG. 10 is carried out, the image data file (containing the acquired image data) with the user information file (containing the authorized user IDs) attached thereto can be stored on the storage medium of the image storage device 104 or on the storage medium of the file server 108. When any authorized user ID is not acquired, the standard user ID is acquired as the operator ID and the resulting user information file is stored. After the file creation notice is transmitted, the amount of the available storage of the image storage device 104 is monitored and displayed into the available-disk-space indication region 309 on the touch panel 105.

Figure 11:
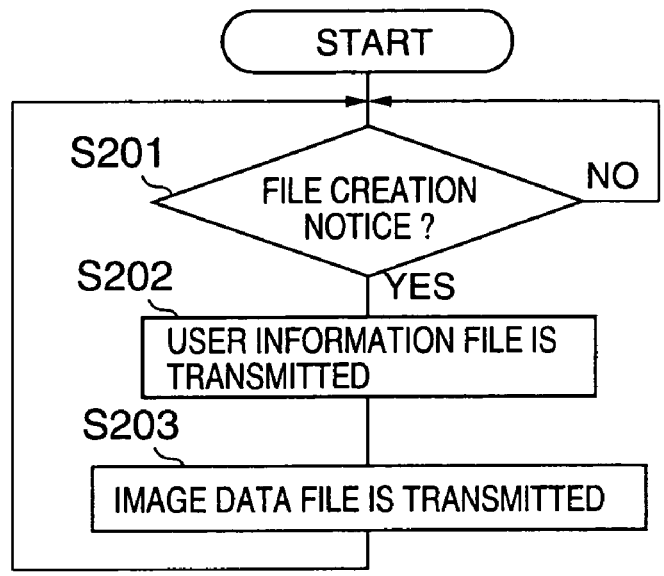
FIG. 11 is a flowchart for explaining an image data transmission process carried out by the controller of the filing system.

FIG. 11 shows an image data transmission process carried out by the controller 110 of the filing system of FIG. 1.

The image data transmission process of FIG. 11 is performed in parallel with the user ID acquisition process of FIG. 9A and FIG. 9B, and the execution thereof is started after the end of the step S109 within the image data capture process of FIG. 10. Hereinafter, the CPU of the controller 110 is referred to as the processor. The image data transmission process of FIG. 11 is performed according to the image data transmission control program described above.

As shown in FIG. 11, at the start of the image data transmission process, step S201 causes the processor to determine whether the file creation notice, which has been transmitted at the step S109 of FIG. 10, is received. When the result at the step S201 is negative, the processor repeats performing the step S201.

When the result at the step S201 is affirmative (or when the file creation notice is received), step S202 causes the processor to transmit the user information file to the image storage device 104 or to the file server 108 via the transmission path 107. The user information file is actually transmitted to an image data storage control program (which will be described later with reference to FIG. 12) of the data processing apparatus 100 or the file server 108. After the step S202 is performed, step S203 causes the processor to transmit the image data file to the image storage device 104 or to the file server 108 via the transmission path 107. The image data file is actually transmitted to the image data storage control program of the data processing apparatus 100 or the file server 108. After the step S203 is performed, the control of the processor is transferred to the step S201.

In either case in which the destination of the file transmission is the image storage device 104 or the file server 108, the above-described image data transmission process of FIG. 11 is carried out by the controller 110 of the data processing apparatus 100 or the file server 108. When the image data transmission process of FIG. 11 is carried out, the image data file (containing the acquired image data) and the user information file (containing the authorized user IDs) can be transmitted to the storage medium of the image storage device 104 or to the storage medium of the file server 108.

Figure 12:
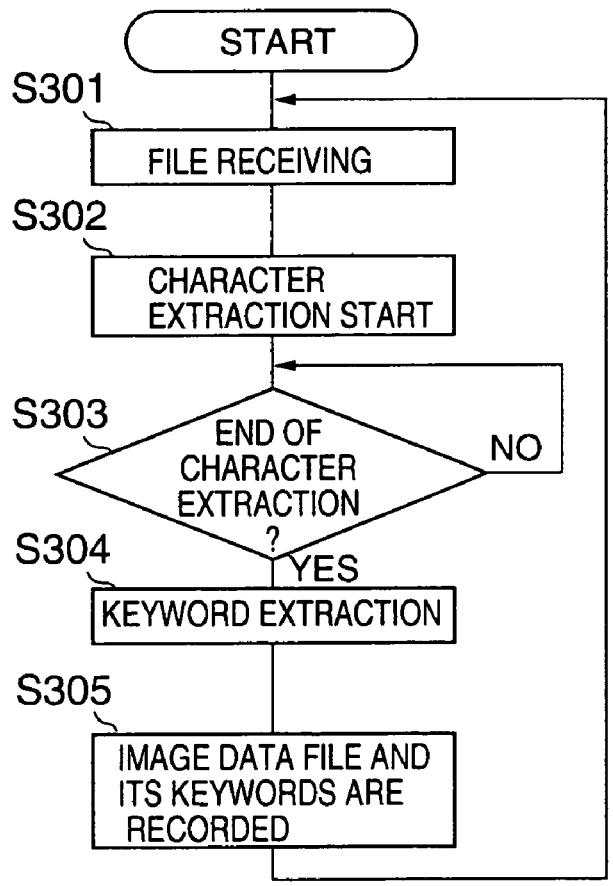
FIG. 12 is a flowchart for explaining an image data storage process carried out by the controller or the file server in the filing system.

FIG. 12 shows an image data storage process carried out by the controller 110 or the file server 108 in the filing system of FIG. 1.

The image data storage process of FIG. 12 is performed in parallel with the user ID acquisition process of FIG. 9A and FIG. 9B, and the execution thereof is started after the end of the step S203 within the image data transmission process of FIG. 11. Hereinafter, the CPU of the controller 110 or the CPU 203 of the file server 108 is referred to as the processor. The image data storage process of FIG. 12 is performed according to the image data storage control program described above.

As shown in FIG. 12, at the start of the image data storage process, step S301 causes the processor to receive the image data file which has been transmitted at the step S203 of FIG. 11. After the step S301 is performed, step S302 causes the processor to start a character extraction process with respect to the received image data file. By the character extraction process, character data is extracted from the image data file by using a known optical character reader (OCR).

Step S303 causes the processor to determine whether the character extraction process which has been started at the step S302 ends. When the result at the step S303 is negative, the processor repeats performing the step S303. When the result at the step S303 is affirmative, step S304 causes the processor to extract characters or character strings which frequently appear among the extracted character data or among specified regions of the extracted character data. Such characters or character strings are extracted as the keywords for the image data file.

After the step S304 is performed, step S305 causes the processor to record the image data file and the keywords thereof to the image storage device 104 or the hard disk device 207 of the file server 108. When the image data storage process of FIG. 12 is carried out, the image data file and its keywords (or the frequent-occurrence characters or character strings) can be stored onto the storage medium of the image storage device 104 or onto the storage medium of the hard disk device 207 of the file server 108.

Figure 13:
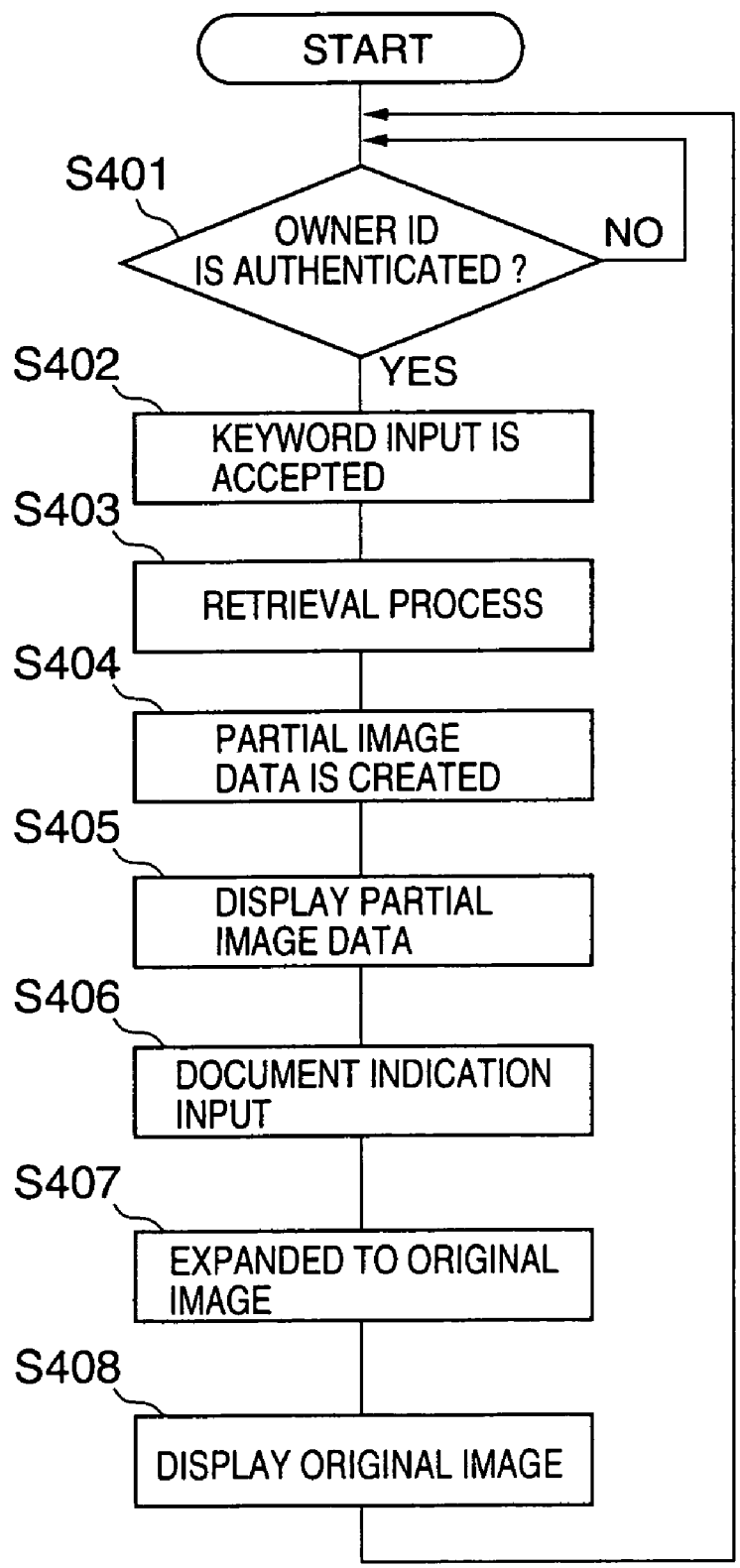
FIG. 13 is a flowchart for explaining an image data access process carried out by the controller or the file server in the filing system.

FIG. 13 shows an image data access process carried out by the controller 110 of the filing system of FIG. 1.

The image data access process of FIG. 13 is subsequently performed upon occurrence of a user retrieval request on a data processing apparatus (which is not shown in FIG. 1 but connected to the data processing apparatus 100 via the transmission path 107) after the acquired image data is stored onto the storage medium of the image storage device 104 or onto the storage medium of the hard disk device 207 of the file server 108 in the filing system. Hereinafter, the CPU of the controller 110 or the CPU 203 of the file server 108 is referred to as the processor.

As shown in FIG. 13, at the start of the image data access process, step S401 causes the processor to determines whether the owner ID of a user who has requested for accessing the stored image data is authenticated. When the result at the step S401 is negative, the control of the processor is transferred to the step S401. When the result at the step S401 is affirmative, step S402 causes the processor to accept a keyword (such as those extracted at the step S304 of FIG. 12) input by the user (or the owner whose owner ID was authenticated).

After the step S402 is performed, step S403 causes the processor to carry out a retrieval process (which will be described later with reference to FIG. 14). After the step S403 is performed, step S404 causes the processor to create a set of partial image data files based on the result of the retrieval of the image data. Step S405 causes the processor to display the partial image data files on a display device of the user's data processing apparatus. Step S406 causes the processor to accept a document indication (one of the partial image data files) input by the user on the display device of the user's data processing apparatus by using its mouse. Step S407 causes the processor to allow the partial image data file to be expanded to the original image.

After the step S407 is performed, step S408 causes the processor to display the original image on the display device of the user's data processing apparatus. While the original image is viewed on the display device, the user is able to print out it on the user's data processing apparatus or to transmit the same to another data processing apparatus over the local area network. After the step S407 is performed, the control of the processor is transferred to the step S401.

When the above-described image data access process of FIG. 13 is carried out, only the user whose owner ID is authenticated can retrieve the stored image data and reproduce or transmit the original image file. Accordingly, the data processing apparatus and method of the filing system of the above-described embodiment are effective in providing increased operability and availability of image data that is stored, reproduced, transmitted or retrieved for the authorized users only, while ensuring security of such image data in the filing system.

Figure 14:
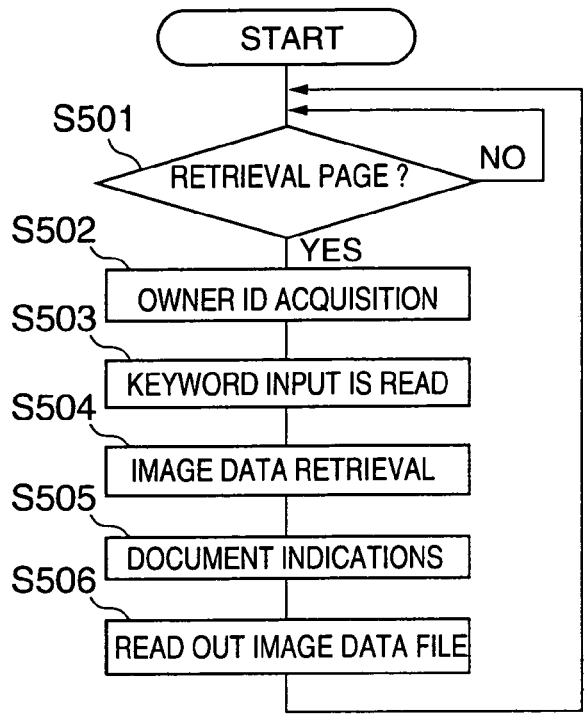
FIG. 14 is a flowchart for explaining a retrieval process carried out by the controller or the file system in the filing system.

FIG. 14 shows a retrieval process carried out by the controller 110 or the file server 108 in the filing system of FIG. 1.

The image data access process of FIG. 14 is performed in parallel with the image data access process of FIG. 13, and the execution thereof is started at the start of the step S403 within the image data access process of FIG. 13. Hereinafter, the CPU of the controller 110 or the CPU 203 of the file server 108 is referred to as the processor.

As shown in FIG. 14, at the start of the retrieval process, step S501 causes the processor to determine whether a retrieval page is displayed. When the result at the step S501 is negative, the control of the processor is transferred to the step S501. When the result at the step S501 is affirmative, step S502 causes the processor to acquire the owner ID which was properly authenticated at the step S401 of FIG. 13.

After the step S502 is performed, step S503 causes the processor to read out the keyword which was input by the user (or the owner) at the step S402 of FIG. 13. Step S504 causes the processor to carry out an image data retrieval based on the authorized user ID and the keyword. After the step S504 is performed, step S505 causes the processor to generate one or a plurality of document indications based on the result of the retrieval of the image data. Step S506 causes the processor to read out a set of partial image data files from the image storage device 104 of the data processing apparatus 100 or the hard disk device 207 of the file server 108. After the step S506 is performed, the control of the processor is transferred to the step S501.

In the above-described embodiment, the authorized users IDs for the image data that need to be exchanged are created when the image data are first captured, and the image data and the authorized user IDs are stored together on the storage medium of the filing system in a such a manner that the stored image data are subsequently accessible by the authorized users using such IDs. The data processing apparatus and method in the filing system of the present embodiment are effective in providing increased operability and availability of image data that is stored, reproduced, transmitted or retrieved for the authorized users only, while ensuring security of such image data in the filing system.

Figure 15:
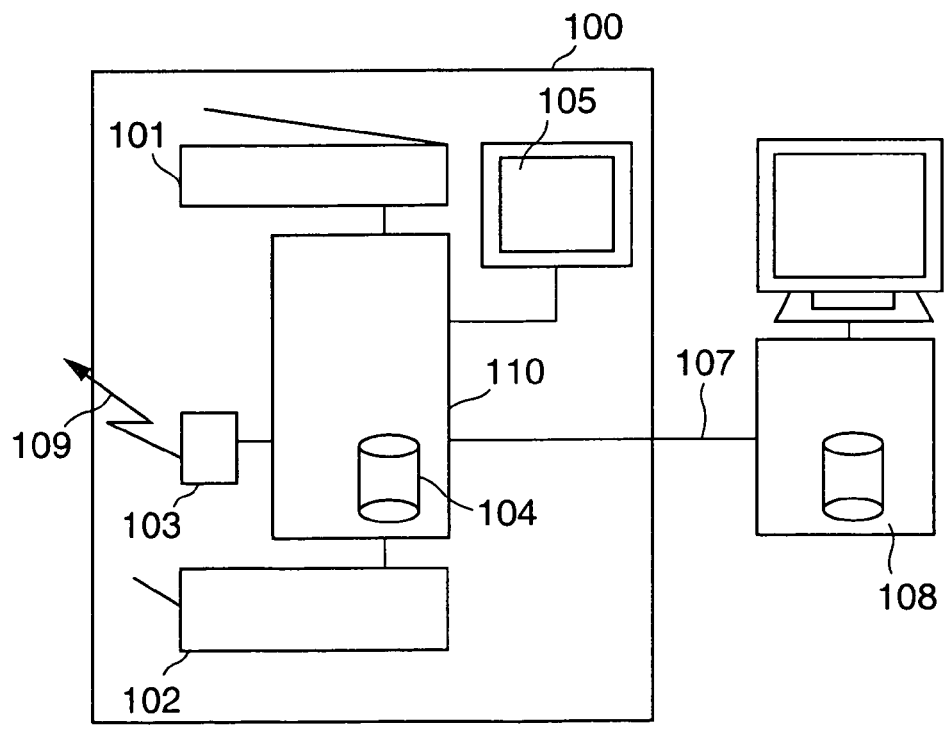
FIG. 15 is a block diagram of a second embodiment of the filing system of the present invention.

Next, FIG. 15 shows a second embodiment of the filing system of the present invention. In FIG. 15, the elements which are essentially the same as corresponding elements in FIG. 1 are designated by the same reference numerals, and a description thereof will be omitted.

In the filing system of FIG. 15, the data processing apparatus 100 and the file server 108 are interconnected by the transmission path 107. The transmission path 107 is, for example, an Ethernet cable. A plurality of data processing apparatuses (or the clients) may be connected to the file server 108 via the transmission path 107, which constitute a local area network or an Intranet.

As shown in FIG. 15, in the data processing apparatus 100, the control keyboard 106 of the previous embodiment is eliminated, and the touch panel 105 of the present embodiment incorporates a user/function select page. Similar to the previous embodiment of FIG. 1, the data processing apparatus 100 in the present embodiment has the copying function, the facsimile function and the scanning function, and captures the image data by using one of the copying, facsimile and scanning functions. The user/function select page displayed on the touch panel 105 includes the list of the user selection buttons 302–306 and 309–311 (which are the same as those of the embodiment of FIG. 3) and a list of operation mode selection buttons corresponding to the copying, facsimile and scanning functions.

Figure 16:
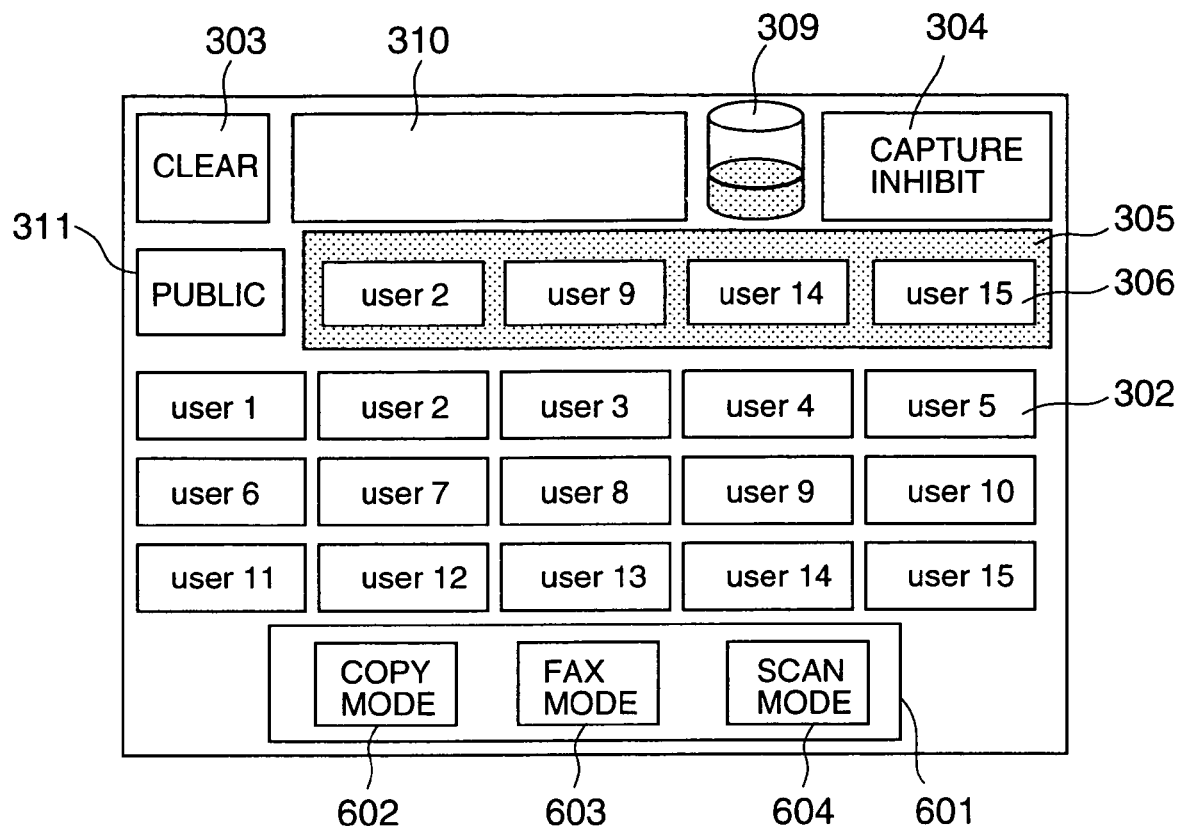
FIG. 16 is a diagram of a user/function select page on the touch panel of the filing system.

FIG. 16 shows a user/function select page on the touch panel 105 of the filing system of FIG. 15.

As shown in FIG. 16, the user/function select page displayed on the touch panel 105 includes a number of user selection buttons 302, a clear button 303, a capture-inhibit button 304, an input-history indication region 305 with frequent selection user buttons 306, an available-disk-space indication region 309, a message indication region 310, a public-mode button 311, and a function indication region 601 with a copy mode button 602, a facsimile mode button 603 and a scan mode button 604.

In the function indication region 601 of the touch panel 105, the copy mode button 602 is to change the displaying page of the touch panel 105 from the user/function select page to a copy operation page when it is depressed. The operator is able to select the number of copies or other copying operations of the data processing apparatus 100 (the scanner 101 and the printer 102) from the copy operation page of the touch panel 105. The facsimile mode button 603 is to change the displaying page of the touch panel 105 from the user/function select page to a facsimile operation page when it is depressed. The operator is able to select the phone number of the destination or other facsimile operations of the data processing apparatus 100 (the CCU 103) from the facsimile operation page of the touch panel 105. The scan mode button 604 is to change the displaying page of the touch panel 105 from the user/function select page to a scanner operation page when it is depressed. The operator is able to select the resolution of the scanner 101 and other scanning operations thereof from the scanner operation page of the touch panel 105.

Figure 17:
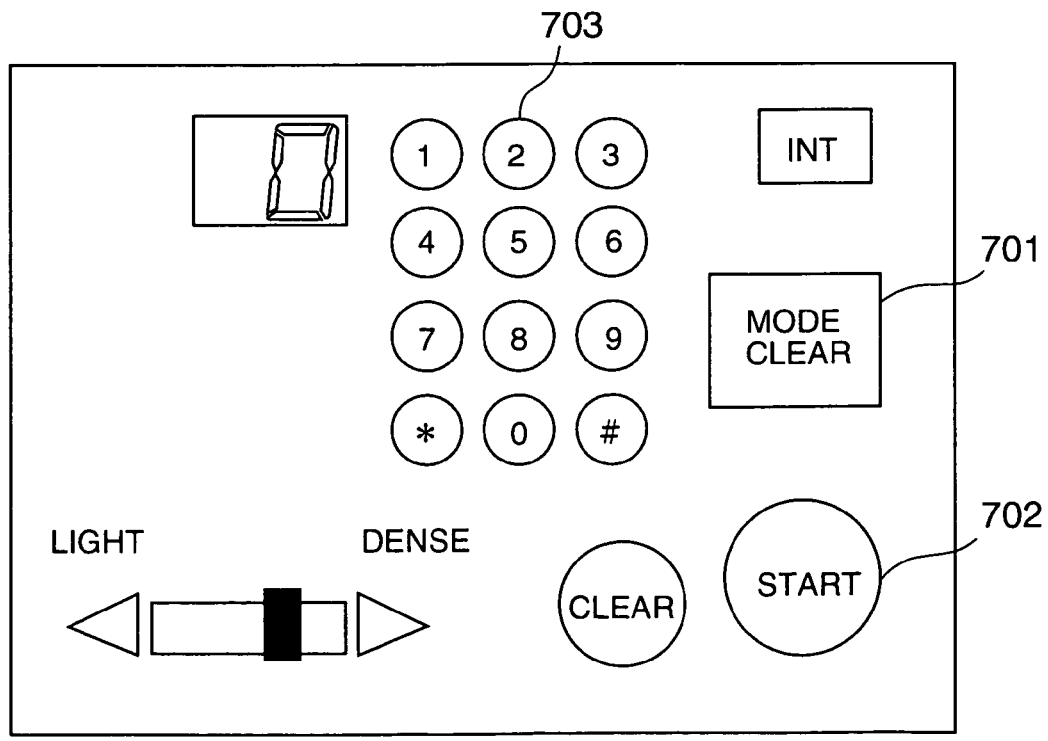
FIG. 17 is a diagram of a copy operation page on the touch panel of the filing system.

FIG. 17 shows a copy operation page on the touch panel 105 of the filing system of FIG. 15.

As described above, when the copy mode button 602 on the touch panel 105 is depressed, the copy operation page of FIG. 17 appears on the touch panel 105. As shown in FIG. 17, the copy operation page displayed on the touch panel 105 includes a mode clear button 701, a start button 702, and ten keys 703. By using the ten keys 703, the operator can select the number of copies. By depressing the start button 702, the copying operation of the data processing apparatus 100 can be started. By depressing the mode clear button 701, the displaying page of the touch panel 105 is changed from the copy operation page to the user/function select page of FIG. 16.

Figure 18A:
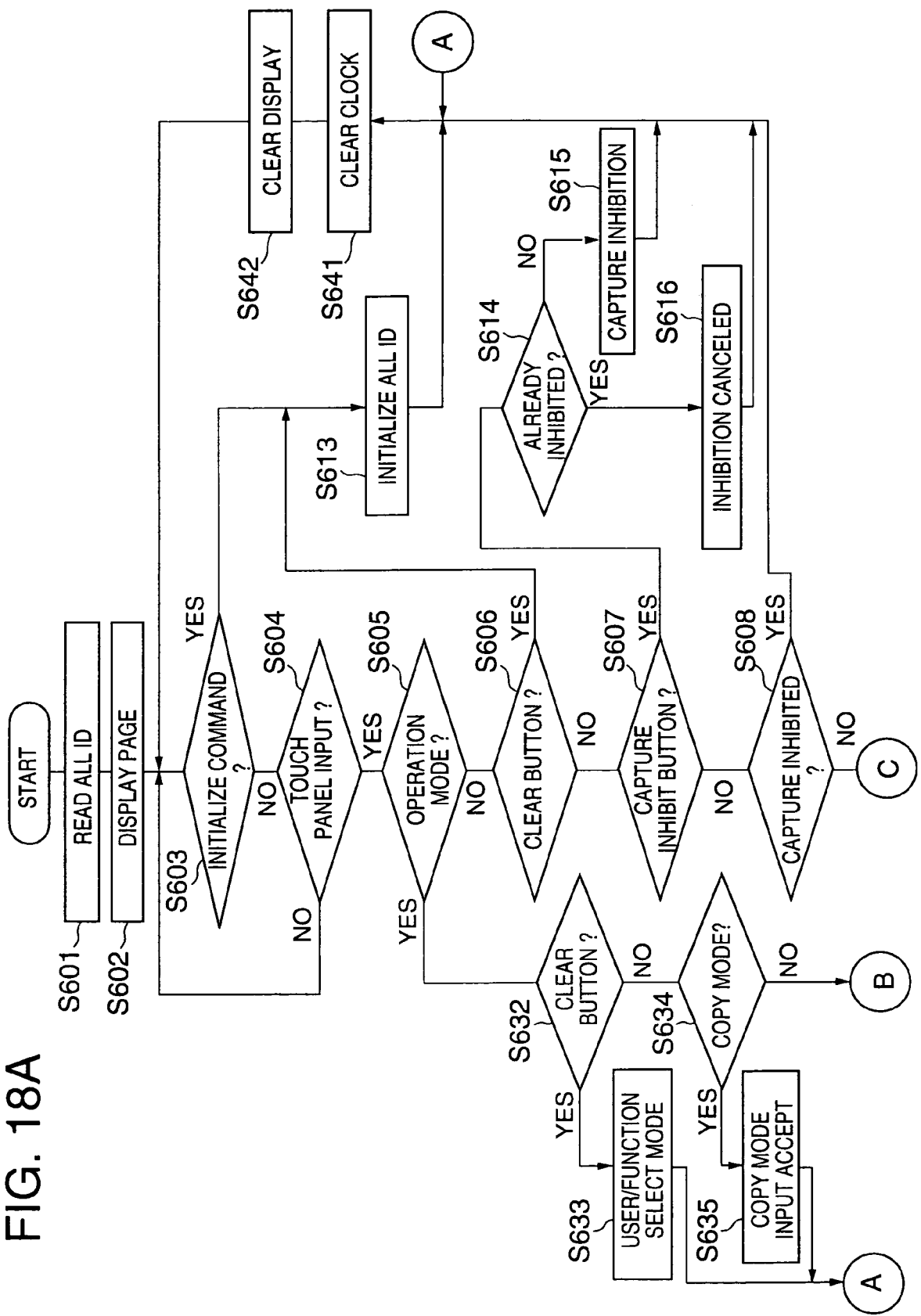
FIG. 18A and FIG. 18B are a flowchart for explaining a user ID acquisition and operation mode process carried out by a control unit of the filing system.
Figure 18B:
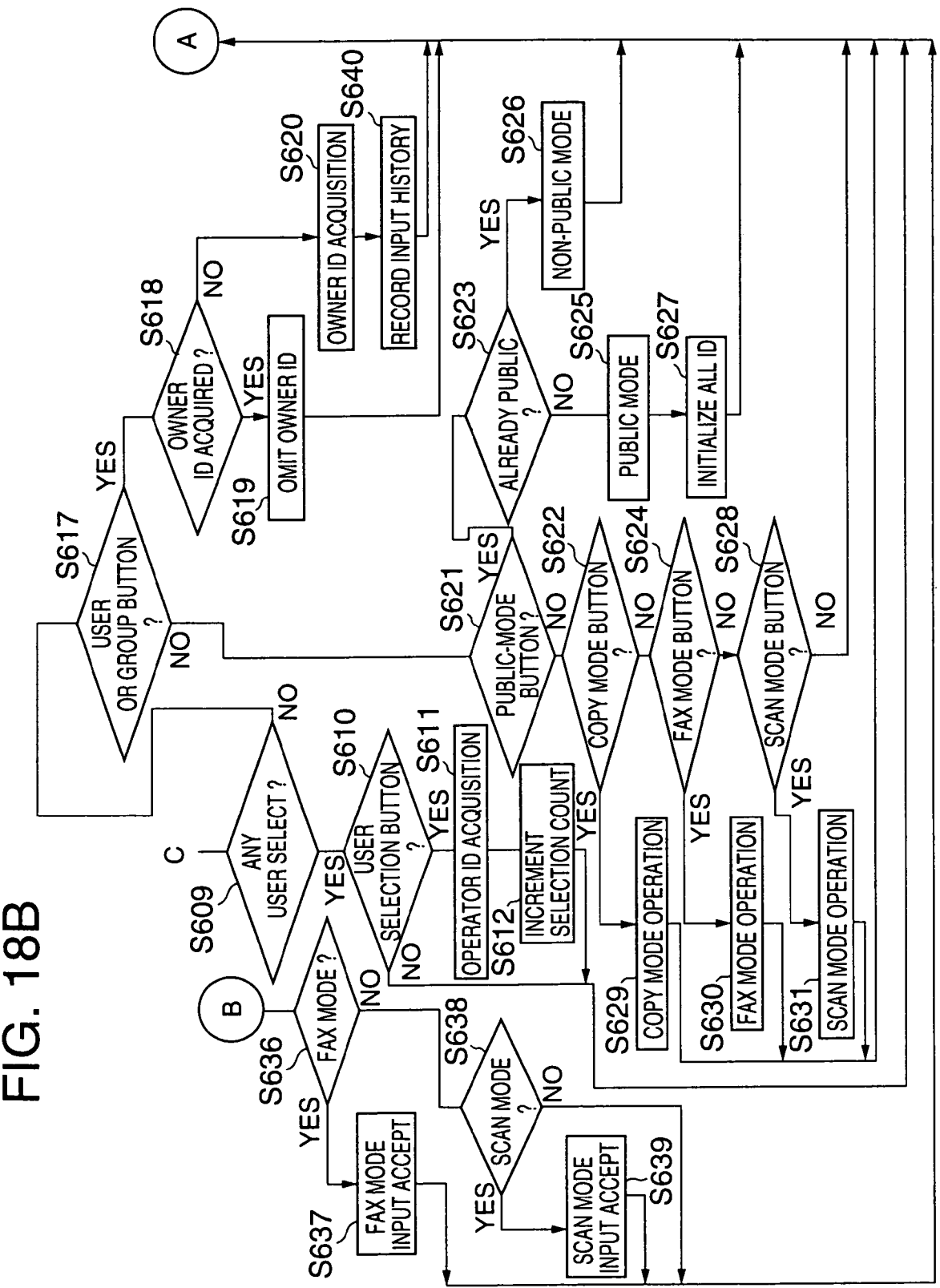

FIG. 18A and FIG. 18B show a user ID acquisition and operation mode process carried out by the controller 110 of the data processing apparatus 100 in the filing system of FIG. 15.

The user ID acquisition and operation mode process of FIG. 18A and FIG. 18B is performed within an initial setting routine which is started when a power switch of the data processing apparatus 100 is turned ON. The user ID acquisition and operation mode process of FIG. 18A and FIG. 18B contains the user ID acquisition process, similar to that of FIG. 9A and FIG. 9B, and operation mode procedures related to the operation mode selection buttons 602–604. Hereinafter, the CPU of the controller 110 is referred to as the processor.

At the start of the user ID acquisition and operation mode process of FIG. 18A, step S601 causes the processor to read out all the user IDs and the group IDs from a user information file of the image storage device 104 so that they are transferred to the RAM of the controller 110. In the present embodiment, this user information file is stored, in advance, on the image storage device 104, and all the user IDs, the group IDs and other matters which are predetermined with respect to the data processing apparatus 100 are contained in the user information file.

After the step S601 is performed, step S602 causes the processor to display a number of sets of indication areas of the touch panel 105 based on the users IDs and the group IDs read out at the step S601. The user selection buttons 302 are displayed on the touch panel 105 in a sequence of the authorized user identifications being defined in the user information file. Step S603 causes the processor to determine whether an initialize command is detected by the processor. The processor (the CPU of the controller 110) includes a clock which measures an elapsed time from a start of operation of the data processing apparatus 100, and the initialize command is transmitted to the processor when the elapsed time measured by the clock exceeds a predetermined reference period. In addition, when the entire data processing on the data processing apparatus 100 is terminated, the initialize command is transmitted to the processor.

When the result at the step S603 is affirmative (or when the initialize command is detected), step S613 causes the processor to initialize all the user IDs, the group IDs and the other matters on the RAM into initial values. After the step S613 is performed, step S641 causes the processor to initialize or clear the measurement of the clock, and step S642 causes the processor to initialize the displayed indication areas of the touch panel 105 into the initial condition. After the step S642 is performed, the control of the processor is transferred to the step S603.

When the result at the step S603 is negative (or when the initialize command is not detected), step S604 causes the processor to determine whether any input is given onto the touch panel 105. When the result at the step S604 is affirmative, step S605 is performed. Otherwise the control of the processor is transferred to the step S603.

Step S605 causes the processor to determine whether the displaying page of the touch panel 105 is changed to one of the copy, facsimile and scan operation pages. When the result at the step S605 is negative, step S606 is performed. When the result at the step S605 is affirmative, step S632 is performed.

Step S606 causes the processor to determine whether the clear button 303 is depressed. When the clear button 303 is depressed, the control of the processor is transferred to the above steps S613, S641 and S642, so that all the user IDs, the group IDs and the other matters on the RAM are initialized, the measurement of the clock is cleared, and the displayed indication areas of the touch panel 105 is cleared. Otherwise step S607 causes the processor to determine whether the capture-inhibit button 304 is depressed.

When the capture-inhibit button 304 is depressed at the step S607, step S614 causes the processor to determine whether the capture inhibition condition already occurs on the data processing apparatus 100. When the result at the step S614 is negative, step S615 causes the processor to inhibit the scanner 101 from capturing the image data, and the data processing apparatus 100 is set in the capture inhibition condition. When the result at the step S614 is affirmative, step S616 causes the processor to cancel the capture inhibition condition. In the latter case, the processor allows the scanner 101 to capture the image data, and the data processing apparatus 100 is returned to the initial condition. After the step S615 or the step S616 is performed, the control of the processor is transferred to the above steps S641 and S642.

When the capture-inhibit button 304 is not depressed at the step S607, step S608 causes the processor to determine whether the capture inhibition condition already occurs on the data processing apparatus 100. When the result at the step S608 is affirmative, the control of the processor is transferred to the above steps S641 and S642. Otherwise the control of the processor is transferred to step S609 shown in FIG. 18B.

When the result at the step S605 is affirmative (or when the displaying page of the touch panel 105 is changed to one of the copy, facsimile and scan operation pages), step S632 causes the processor to determine whether the clear button 701 is depressed. When the clear button 701 is depressed, step 633 causes the processor to change the displaying page of the touch panel 105 to the user/function select page. After the step S633 is performed, the control of the processor is transferred to the above steps S641 and S642.

When the result at the step S632 is negative (or when the clear button 701 is not depressed), step S634 causes the processor to determine whether the copy operation page currently occur on the touch panel 105. When the result at the step S634 is affirmative, step S635 causes the processor to accept an input to the copy operation page of the touch panel 105. After the step S635 is performed, the control of the processor is transferred to the above steps S641 and S642. When the result at the step S634 is negative, the control of the processor is transferred to step S636 shown in FIG. 18B.

As shown in FIG. 18B, step S636 causes the processor to determine whether the facsimile operation page currently occur on the touch panel 105. When the result at the step S636 is affirmative, step S637 causes the processor to accept an input to the facsimile operation page of the touch panel 105. After the step S637 is performed, the control of the processor is transferred to the above steps S641 and S642. When the result at the step S636 is negative, step S638 causes the processor to determine whether the scanner operation page currently occur on the touch panel 105. When the result at the step S638 is affirmative, step S639 causes the processor to accept an input to the scanner operation page of the touch panel 105. After the step S639 is performed, the control of the processor is transferred to the above steps S641 and S642. When the result at the step S638 is negative, the control of the processor is transferred to the above steps S641 and S642.

As shown in FIG. 18B, step S609 causes the processor to determine whether any user ID acquisition is already performed. When the result at the step S609 is negative (or when the user ID is selected for the first time), step S610 causes the processor to determine whether the user selection buttons 302 on the touch panel 105 are depressed. When the user selection buttons 302 are not depressed, the control of the processor is transferred to the above steps S641 and S642. When any of the user selection buttons 302 are depressed, step S611 causes the processor to acquire one or a plurality of the operator IDs corresponding to the depressed user selection buttons 302. After the step S611 is performed, step S612 causes the processor to increment a user selection count on the RAM for each of the acquired operator IDs. That is, the processor records the latest user selection counts (the input history) of the operator IDs to the RAM. After the step S612 is performed, the control of the processor is transferred to the above steps S641 and S642.

When any user ID acquisition is already performed (or when the user ID is subsequently selected) at the step S609, step S617 causes the processor to determine whether the user selection buttons 302 or the group selection buttons 401 on the touch panel 105 are depressed. When the selection buttons 302 or 401 are depressed at the step S617, step S618 causes the processor to determine whether the owner IDs (one or a plurality of the owner IDs) corresponding to the depressed selection buttons 302 or 401 are already acquired. When the owner IDs are already acquired at the step S618, step S619 causes the processor to omit the owner IDs from the owner ID acquisition. When the owner IDs are not yet acquired (or when the owner IDs are selected for the first time) at the step S618, step S620 causes the processor to acquire the owner IDs (one or a plurality of the owner IDs) corresponding to the depressed selection buttons 302 or 401. After the step S620 is performed, step S640 causes the processor to increment a user selection count on the RAM for each of the acquired owner IDs. That is, the processor records the latest user selection counts (the input history) of the owner IDs to the RAM at the step S640. After the step S619 or the step S640 is performed, the control of the processor is transferred to the above steps S641 and S642.

When none of the selection buttons 302 and 401 are depressed at the step S617, step S621 causes the processor to determine whether the public-mode button 311 on the touch panel 105 is depressed. When the public-mode button 311 is not depressed, step S622 is performed. When the public-mode button 311 is depressed, step S623 causes the processor to determine whether the public mode ID is already acquired. When the result at the step S623 is affirmative (or when the button 311 is subsequently depressed), step S626 causes the processor to cancel the acquired public mode ID on the RAM so that the captured image data is not correlated with the public mode ID (the non-public mode). After the step S626 is performed, the control of the processor is transferred to the above steps S641 and S642.

When the result at the step S623 is negative (or when the button 311 is depressed for the first time), step S625 causes the processor to acquire the public mode ID so that the captured image data is correlated with the public mode ID, and all the authorized users are allowed to access the stored image data (the public mode). After the step S625 is performed, step S627 causes the processor to initialize all the user IDs, the group IDs and the other matters on the RAM into the initial values. After the step S627 is performed, the control of the processor is transferred to the above steps S641 and S642.

When the result at the step S621 is negative, step S622 causes the processor to determine whether the copy mode button 602 on the touch panel 105 is depressed. When the copy mode button 602 is not depressed, step S624 is performed. When the copy mode button 602 is depressed, step S629 causes the processor to change the displaying page of the touch panel 105 to the copy operation page. After the step S629 is performed, the control of the processor is transferred to the above steps S641 and S642.

Step S624 causes the processor to determine whether the facsimile mode button 602 on the touch panel 105 is depressed. When the facsimile mode button 603 is not depressed, step S628 is performed. When the facsimile mode button 603 is depressed, step S630 causes the processor to change the displaying page of the touch panel 105 to the facsimile operation page. After the step S630 is performed, the control of the processor is transferred to the above steps S641 and S642.

Step S628 causes the processor to determine whether the scan mode button 604 on the touch panel 105 is depressed. When the scan mode button 604 is not depressed, the control of the processor is transferred to the above steps S641 and S642. When the scan mode button 604 is depressed, step S631 causes the processor to change the displaying page of the touch panel 105 to the scanner operation page. After the step S631 is performed, the control of the processor is transferred to the above steps S641 and S642.

As described above, in the user ID acquisition and operation mode process of FIG. 18A and FIG. 18B, when any of the selection buttons 302 and 306 are depressed at the first attempt, one or a plurality of the operator IDs corresponding to the depressed buttons are acquired by the controller 110, and when any of the selection buttons 302 and 401 are depressed at the second attempt, one or a plurality of the owner IDs corresponding to the depressed buttons are acquired by the controller 110. When the initialize command is detected upon the time-over event, the clear button depression or the entire data processing end, all the user IDs, the group IDs and the other matters on the RAM are initialized by the controller 110. Further, in the user ID acquisition and operation mode process of FIG. 18A and FIG. 18B, when one of the operation mode selection buttons 602–604 is depressed, the displaying page of the touch panel 105 is changed to a corresponding operation mode page so that the user can select the desired input to the operation mode page of the touch panel 105.

Figure 19:
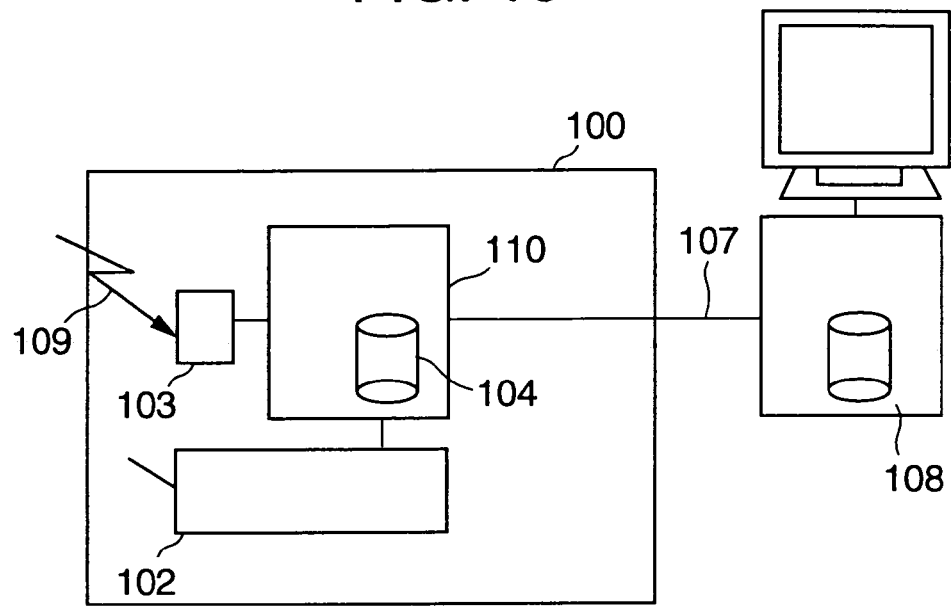
FIG. 19 is a block diagram of a third embodiment of the filing system of the present invention.

Next, FIG. 19 shows a third embodiment of the filing system of the present invention. In FIG. 19, the elements which are essentially the same as corresponding elements in FIG. 1 are designated by the same reference numerals, and a description thereof will be omitted.

In the filing system of FIG. 19, the data processing apparatus 100 and the file server 108 are interconnected by the transmission path 107. The transmission path 107 is, for example, an Ethernet cable. A plurality of data processing apparatuses (or the clients) may be connected to the file server 108 via the transmission path 107, which constitute a local area network or an Intranet.

As shown in FIG. 19, in the data processing apparatus 100 of the present embodiment, the scanner 101, the touch panel 105 and the control keyboard 106 in the previous embodiment of FIG. 1 are eliminated. The data processing apparatus 100 in the present embodiment has at least the facsimile receiving function of the CCU 103, and captures the image data by using the facsimile receiving function of the CCU 103.

Figure 20:
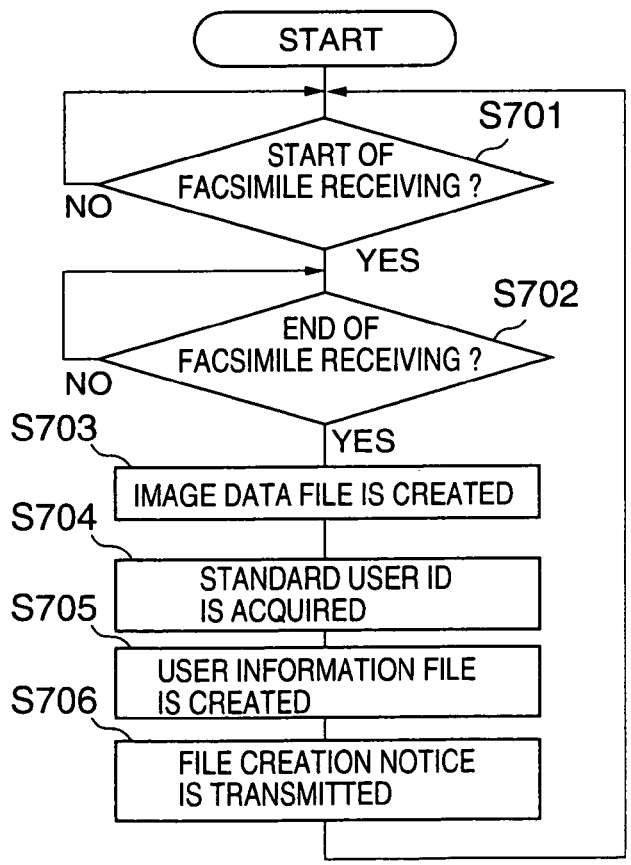
FIG. 20 is a flowchart for explaining an image data capture process carried out by a control unit of the filing system.

FIG. 20 shows an image data capture process carried out by the controller 110 of the filing system of FIG. 19.

The image data capture process of FIG. 20 is performed in parallel with a user ID acquisition process which is similar to those of the first and second embodiments, and the execution thereof is started upon occurrence of the facsimile receiving processing of the data processing apparatus 100. Hereinafter, the CPU of the controller 110 is referred to as the processor.

As shown in FIG. 20, at the start of the image data capture process, step S701 causes the processor to determine whether a start of the facsimile receiving of the CCU 103 is detected. When the result at the step S701 is negative, the processor repeats performing the step S701. When the result at the step S701 is affirmative, step S702 causes the processor to determine whether an end of the facsimile receiving of the CCU 103 is detected. When the result at the step S702 is negative, the processor repeats performing the step S702.

When the result at the step S702 is affirmative, step S703 causes the processor to create an image data file on the image storage device 104 based on the acquired image data during the facsimile receiving. After the step S703 is performed, step S704 causes the processor to acquire a standard user ID (the default setting data) as the operator ID. After the step S704 is performed, step S705 causes the processor to add the user information file to the image data file. After the step S705 is performed, step S706 causes the processor to transmit a file creation notice to the image data transmission control program. After the step S706 is performed, the control of the processor is transferred to the above step S701.

When the above-described image data capture process of FIG. 20 is carried out, the image data file (containing the acquired image data) with the user information file attached thereto can be stored on the storage medium of the image storage device 104 or on the storage medium of the file server 108. As any authorized user ID is not acquired when the facsimile receiving processing of the CCU 103 is performed, the standard user ID is acquired as the operator ID and the resulting user information file is stored.

The above-described image data capture process of FIG. 20 is carried out only when the facsimile receiving processing of the CCU 103 is started. However, the present invention is not limited to this embodiment. For example, see the image data capture process of FIG. 10 for the first embodiment of FIG. 1.

Figure 21:
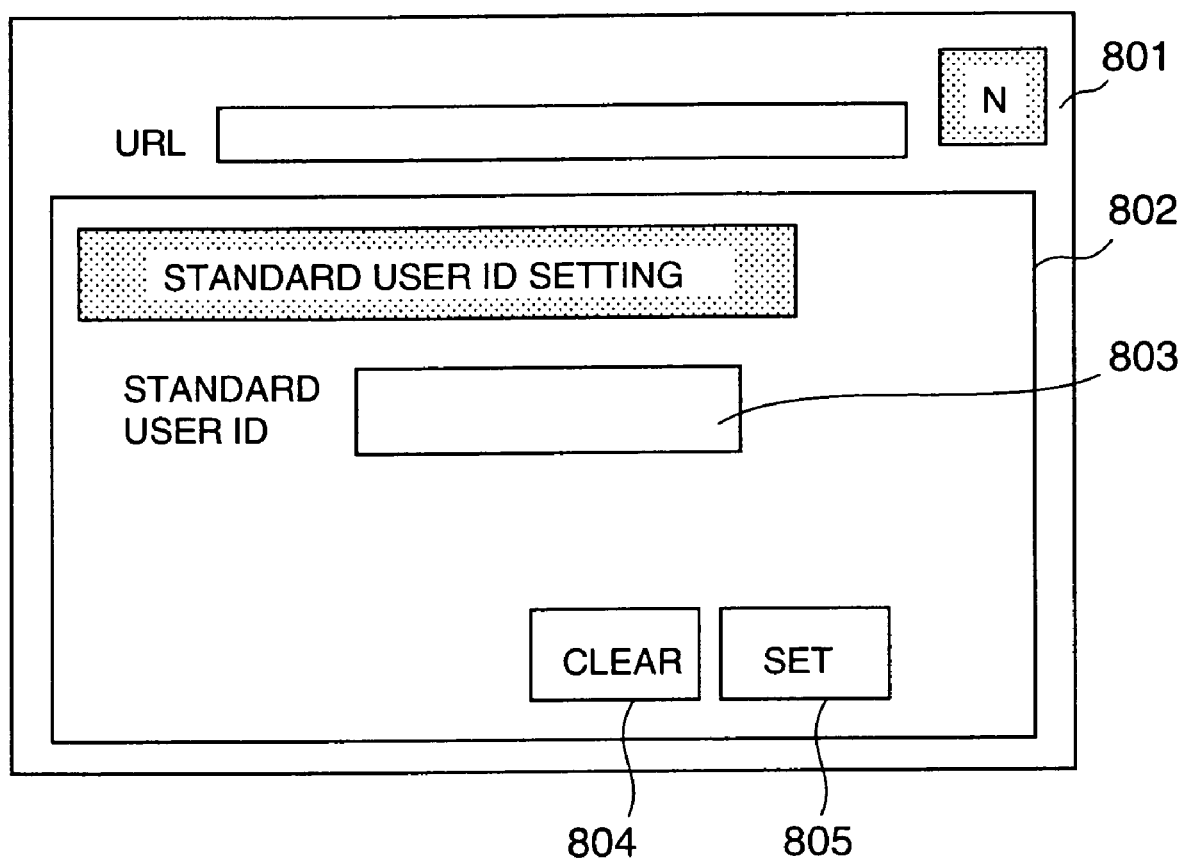
FIG. 21 is a diagram showing a standard user ID setting page on a display device of a client data processing apparatus in the filing system.

FIG. 21 shows a standard user ID setting page on a display device of a client data processing apparatus in the filing system of FIG. 19.

In the present embodiment, the controller 110 of the data processing apparatus 100 acquires a standard user ID which is predetermined by the operator on the standard user ID setting page of the display device of the client data processing apparatus in the filing system of FIG. 19. The standard user ID is transmitted to the controller 110 of the remote data processing apparatus 100 via the transmission path 107 by using a Web server function of each of the data processing apparatuses in the filing system of FIG. 19.

In the present embodiment, each of the plurality of data processing apparatuses connected to the file server 108 via the transmission path 107 includes the Web server function. As shown in FIG. 21, the client data processing apparatus includes a Web browser 801, and a standard user ID setting page 802 is displayed on the display device of the client data processing apparatus. The operator on the standard user ID setting page 802 can input a desired standard user ID from a standard user ID input region 803. The standard user ID may be any user ID or user name. When the standard user ID is properly input, the operator clicks a set button 805 on the standard user ID setting page 802 of the display device by using a mouse. When an error of the input standard user ID occurs, the operator clicks a clear button 804 on the standard user ID setting page 802 by using the mouse. If the clear button 804 is clicked, the input to the standard user ID input region 803 is cleared, and the standard user ID input region 803 is returned to its initial state.

In the above-described embodiment, the controller 110 of the data processing apparatus 100 can acquire a standard user ID which is predetermined by the operator on the standard user ID setting page 802 of the display device of the client data processing apparatus. The standard user ID is transmitted to the controller 110 of the remote data processing apparatus 100 via the transmission path 107 by using the Web server function. IN addition, the operator on the standard user ID setting page 802 of the display device of the client data processing apparatus can modify the standard user ID or add a desired standard user ID to the filing system.

The present invention is not limited to the above-described embodiments, and variations and modifications may be made without departing from the scope of the present invention.

Further, the present invention is based on Japanese priority application No. 10-279,019, filed on Sep. 30, 1998, the entire contents of which are hereby incorporated by reference.

What is claimed is:

1. A filing system in which a data processing apparatus is connected to a file server via a network, comprising:

a data capturing unit provided in the data processing apparatus and configured to capture image data of a document into the data processing apparatus;

a data storing unit configured to store the captured image data in an image storage medium of the data processing apparatus;

an access management unit configured to correlate owner identifications of users who use the data processing apparatus to process the image data, with the stored image data in the image storage medium, to correlate re-use owner identifications of users who are at least one of a user unit and a group unit allowed to retrieve or read the stored image data, with the stored image data in the image storage medium, and to allow the stored image data to be accessed when any of the owner identifications or the re-use owner identifications correlated with the stored image data is verified;

a data output unit configured to output the image data in a readable manner by retrieving the stored image data of the image storage medium when the access to the stored image data is allowed by the access management unit;

an owner identification acquiring unit configured to acquire the owner identifications; and a re-use owner identification acquiring unit configured to acquire one or more of the re-use owner identifications;

wherein at least one of the owner identification acquiring unit and the re-use owner identification acquiring unit include:

a list displaying unit configured to display, on a display screen, a list of the owner identifications or the re-use owner identifications each containing at least one of user names and user identifiers; and a selection input unit configured to select one of the owner identifications or the re-use owner identifications from among the displayed list on the display screen when a corresponding selection button of the display screen is depressed;

wherein the access management unit is configured to store the image data from the data capturing unit into the image storage medium, and to correlate each of the owner identifications of the owner identification acquiring unit and the re-use owner identifications of the re-use owner identification acquiring unit with the stored image data each time the image data is stored in the image storage medium;

wherein the owner identification acquiring unit and the re-use owner identification acquiring unit are configured to acquire the owner identifications or the re-use owner identifications in a sequence of selections from the displayed list of the owner identifications or the re-use owner identifications by the selection input unit, wherein one of the owner identifications or the re-use owner identifications acquired in said sequence is selected from among the displayed list on the display screen when the corresponding selection button of the display screen is depressed;

wherein the data output unit is configured to output the image data in a readable manner by retrieving the stored image of the image storage medium correlated with the selected one of the owner identifications or the re-use owner identifications;

wherein the owner identification acquiring unit and the re-use owner identification acquiring unit are configured to acquire a preset owner identification when the data capturing unit is provided in the data processing apparatus having at least one of a copying function, a facsimile function and a scanning function and configured to allow a user to operate the data processing apparatus when the owner identifications or the re-use owner identifications are acquired; and wherein the access management unit is configured to add or change the owner identifications or the re-use owner identifications.

2. A filing system in which a data processing apparatus is connected to a file server via a network, comprising:

a data capturing unit provided in the data processing apparatus and configured to capture image data of a document into the data processing apparatus;

a data storing unit configured to store the captured image data in an image storage medium of the data processing apparatus;

an access management unit configured to correlate owner identifications of users who use the data processing apparatus to process the image data, with the stored image data in the image storage medium, to correlate re-use owner identifications of users who are at least one of a user unit and a group unit allowed to retrieve or read the stored image data, with the stored image data in the image storage medium, and to allow the stored image data to be accessed when any of the owner identifications or the re-use owner identifications correlated with the stored image data is verified;

a data output unit configured to output the image data in a readable manner by retrieving the stored image data of the image storage medium when the access to the stored image data is allowed by the access management unit;

an owner identification acquiring unit configured to acquire the owner identifications; and a re-use owner identification acquiring unit configured to acquire one or more of the re-use owner identifications;

wherein at least one of the owner identification acquiring unit and the re-use owner identification acquiring unit include:

a list displaying unit configured to display, on a display screen, a list of the owner identifications or the re-use owner identifications each containing at least one of user names and user identifiers; and a selection input unit configured to select one of the owner identifications or the re-use owner identifications from among the displayed list on the display screen when a corresponding selection button of the display screen is depressed;

wherein the access management unit is configured to store the image data from the data capturing unit into the image storage medium, and to correlate each of the owner identifications of the owner identification acquiring unit and the re-use owner identifications of the re-use owner identification acquiring unit with the stored image data each time the image data is stored in the image storage medium;

wherein the owner identification acquiring unit and the re-use owner identification acquiring unit are configured to display, when the data capturing unit is provided in the data processing apparatus having at least two of a copying function, a facsimile function, a scanning function and a printing function, the list of the owner identifications or the re-use owner identifications on the display screen of the selection input unit of the data processing apparatus in a sequence of selections from the displayed list of the owner identifications of the re-use owner identifications by the selection input unit, wherein one of the owner identifications or the re-use owner identifications displayed in said sequence is selected from among the displayed list on the display screen when the corresponding selection button of the display screen is depressed;

wherein the data output unit is configured to output the image data in a readable manner by retrieving the stored image of the image storage medium correlated with the selected one of the owner identifications or the reuse owner identifications;

wherein the owner identification acquiring unit and the re-use owner identification acquiring unit are configured to acquire a preset owner identification when the data capturing unit is provided in the data processing apparatus having at least one of a copying function, a facsimile function and a scanning function and configured to allow a user to operate the data processing apparatus when the owner identifications or the re-use owner identifications are acquired; and wherein the access management unit is configured to add or change the owner identifications or the re-use owner identifications.

3. A filing system in which a data processing apparatus having at least two of a copying function, a facsimile function, a scanning function and a printing function is connected to a file server via a network, the filing system comprising:

a data capturing unit provided in the data processing apparatus and configured to capture image data of a document into the data processing apparatus;

a data storing unit configured to store the captured image data in an image storage medium of the data processing apparatus;

an access management unit configured to correlate owner identifications of users who use the data processing apparatus to process the image data, with the stored image data in the image storage medium, to correlate re-use owner identifications of users who are allowed to retrieve or read the stored image data, with the stored image data in the image storage medium, and to allow the stored image data to be accessed when any of the owner identifications or the re-use owner identifications correlated with the stored image data is verified;

a data output unit configured to output the image data in a readable manner by retrieving the stored image data of the image storage medium when the access to the stored image data is allowed by the access management unit; and an owner identification acquiring unit configured to acquire the owner identifications or the re-use owner identifications;

wherein the access management unit is configured to store the image data from the data capturing unit into the image storage medium, and to correlate each of the owner identifications or the re-use owner identifications of the owner identification acquiring unit with the stored image data each time the image data is stored in the image storage medium;

wherein the owner identification acquiring unit includes:
list displaying unit configured to display, on a display screen, a list of the owner identifications or the re-use owner identifications; and
a selection input unit configured to select one of the owner identifications or the re-use owner identifications from among the displayed list on the display screen when a corresponding selection button of the display screen is depressed wherein the owner identifications or the re-use owner identifications are acquired in a sequence of selections from the displayed list of the owner identifications or the re-use owner identifications by the selection input unit and one of the owner identifications or the re-use owner identifications acquired in said sequence is selected from among the displayed list;

wherein the data output unit is configured to output the image data in a readable manner by retrieving the stored image of the image storage medium correlated with the selected one of the owner identifications or the re-use owner identifications; and wherein the access management unit is configured to add or change the owner identifications or the re-use owner identifications.

4. The filing system according to claim 3, wherein the owner identification acquiring unit is configured to acquire a preset owner identification when the owner identifications or the re-use owner identifications will not be acquired, and
wherein the access management unit uses a Web server function to create a Web page configured to set the preset owner identification to allow a client computer, connected to the data processing apparatus via the network, to transmit the Web page with the preset owner identification to the access management unit.

5. The filing system according to claim 3, wherein each of the owner identifications or the re-use owner identifications contains at least one of user names and user identifiers.

6. A filing system in which a data processing apparatus is connected to a file server via a network, comprising:

a data capturing unit provided in the data processing apparatus and configured to capture image data of a document into the data processing apparatus;

a data storing unit configured to store image data in an image storage medium of the data processing apparatus;

an access management unit configured to correlate owner identifications of users who use the data processing apparatus to process the image data, with the stored image data in the image storage medium, to correlate re-use owner identifications of users who are at least one of a user unit and a group unit allowed to retrieve or read the stored image data, with the stored image data in the image storage medium, and to allow the stored image data to be accessed when any of the owner identifications or the re-use owner identifications correlated with the stored image data is verified;

a data output unit configured to output the image data in a readable manner by retrieving the stored image data of the image storage medium when the access to the stored image data is allowed by the access management unit;

an owner identification acquiring unit configured to acquire the owner identifications; and a re-use owner identification acquiring unit configured to acquire one or more of the re-use owner identifications;

wherein at least one of the owner identification acquiring unit and the re-use owner identification acquiring unit include:
a list displaying unit configured to display, on a display screen, a list of the owner identifications or the re-use owner identifications each containing at least one of user names and user identifiers;
a selection input unit configured to select one of the owner identifications or the re-use owner identifications from among the displayed list on the display screen when a corresponding selection button of the display screen is depressed; and
a user selection number counting unit configured to count a user selection number for each of the owner identifications or the re-use owner identifications;

wherein the access management unit is configured to store the image data from the data capturing unit into the image storage medium, and to correlate each of the owner identifications of the owner identification acquiring unit and the re-use owner identifications of the re-use owner identification acquiring unit with the stored image data each time the image data is stored in the image storage medium;

wherein the list displaying unit is configured to display, on the display screen, a part of the list of the owner identifications or the re-use owner identifications which appear in a sequence based on the user selection number counted for each of the owner identifications or the re-use owner identifications by the user selection number counting unit, wherein one of the owner identifications or the re-use owner identifications appearing in said sequence is selected from among the displayed list on the display screen when the corresponding selection button of the display screen is depressed;

wherein the data output unit is configured to output the image data in a readable manner by retrieving the stored image of the image storage medium correlated with the selected one of the owner identifications or the re-use owner identifications;

wherein the owner identification acquiring unit and the re-use owner identification acquiring unit are configured to acquire a preset owner identification when the data capturing unit is provided in the data processing apparatus having at least one of a copying function, a facsimile function and a scanning function and configured to allow a user to operate the data processing apparatus when the owner identifications or the re-use owner identifications are acquired; and wherein the access management unit is configured to add or change the owner identifications or the re-use owner identifications.

7. The filing system according to claim 6, wherein the owner identification acquiring unit and the re-use owner identification acquiring unit are configured to acquire a preset owner identification when the data capturing unit is provided in the data processing apparatus having at least one of a facsimile function and a printing function and configured to inhibit a user from operating the data processing apparatus when a capture inhibition identification is acquired, and wherein the access management unit is configured to add or change the owner identifications or the re-use owner identifications.

8. The filing system according to claim 6, wherein the access management unit uses a Web server function to create a Web page configured to set the preset owner identification to allow a client computer, connected to the data processing apparatus via the network, to transmit the Web page with the preset owner identification to the access management unit.

9. The filing system according to claim 6, further comprising a unit configured to monitor an amount of available storage of the image storage medium and to display the amount of available storage, wherein, when the amount of available storage of the image storage medium is below a lower limit, a warning message indicating a lack of the available storage is displayed.

10. The filing system according to claim 6, wherein the data storing unit includes a first storage device of the data processing apparatus and a second storage device of the file server, and wherein the data processing apparatus includes a communication control unit configured to transmit the image data, stored in the first storage device, to the second storage device via the network.

11. A filing system in which a data processing apparatus is connected to a file server via a network, comprising;

a data capturing unit provided in the data processing apparatus and configured to capture image data of a document into the data processing apparatus;

a data storing unit configured to store the captured image data in an image storage medium of the data processing apparatus;

an access management unit configured to correlate owner identifications of users who use the data processing apparatus to process the image data, with the stored image data in the image storage medium, to correlate re-use owner identifications of users who are allowed to retrieve or read the stored image data, with the stored image data in the image storage medium, and to allow the stored image data to be accessed when any of the owner identifications or the re-use owner identifications correlated with the stored image data is verified;

a data output unit configured to output the image data in a readable manner by retrieving the stored image data of the image storage medium when the access to the stored image data is allowed by the access management unit; and an owner identification acquiring unit configured to acquire the owner identifications or the re-use owner identifications;

wherein the access management unit is configured to store the image data from the data capturing unit into the image storage medium, and to correlate each of the owner identifications or the re-use owner identifications of the owner identification acquiring unit with the stored image data each time the image data is stored in the image storage medium;

wherein the owner identification acquiring unit includes:
a list displaying unit configured to display, on a display screen, a list of the owner identifications or the reuse owner identifications; and a selection input unit configured to select one of the owner identifications or the re-use owner identifications from among the displayed list on the display screen when a corresponding selection button of the display screen is depressed wherein the owner identifications or the re-use owner identifications are acquired in a sequence of selections from the displayed list of the owner identifications or the re-use owner identifications by the selection input unit and one of the owner identifications or the re-use owner identifications acquired in said sequence is selected from among the displayed list;

wherein the data output unit is configured to output the image data in a readable manner by retrieving the stored image of the image storage medium correlated with the selected one of the owner identifications or the re-use owner identifications; and wherein the data processing apparatus has at least two of a copying function, a facsimile function, a scanning function, and a printing function.

12. The filing system according to claim 11, wherein the access management unit is configured to add or change the owner identifications or the re-use owner identifications.

13. The filing system according to claim 12, wherein the owner identification acquiring unit is configured to acquire a preset owner identification when the owner identifications or the re-use owner identifications will not be acquired, and wherein the access management unit uses a Web server function to create a Web page configured to set the preset owner identification to allow a client computer, connected to the data processing apparatus via the network, to transmit the Web page with the preset owner identification to the access management unit.

14. The filing system according to claim 11, wherein each of the owner identifications or the re-use owner identifications contains at least one of user names and user identifiers.

15. A printing device which is connected to a file server via a network, the printing device comprising:

a data capturing unit provided in the printing device and configured to capture image data of a document into the printing device;

a data storing unit configured to store the captured image data in an image storage medium of the printing device;

an access management unit configured to correlate owner identifications of users who use the printing device to process the image data, with the stored image data in the image storage medium, to correlate re-use owner identifications of users who are allowed to retrieve or read the stored image data, with the stored image data in the image storage medium, and to allow the stored image data to be accessed when any of the owner identifications or the re-use owner identifications correlated with the stored image data is verified;
a data printing unit configured to print the image data on a printing medium by retrieving the stored image data of the image storage medium when the access to the stored image data is allowed by the access management unit; and
an owner identification acquiring unit configured to acquire the owner identifications or the re-use owner identifications;
wherein the access management unit is configured to store the image data from the data capturing unit into the image storage medium, and to correlate each of the owner identifications or the re-use owner identifications of the owner identification acquiring unit with the stored image data each time the image data is stored in the image storage medium;
wherein the owner identification acquiring unit includes:
- a list displaying unit configured to display, on a display screen, a list of the owner identifications or the re-use owner identifications; and
- a selection input unit configured to select one of the owner identifications or the re-use owner identifications from among the displayed list on the display screen when a corresponding selection button of the display screen is depressed whereby the owner identifications or the re-use owner identifications are acquired in a sequence of selections from the displayed list of the owner identifications or the re-use owner identifications by the selection input unit and one of the owner identifications or the re-use owner identifications acquired in said sequence is selected from among the displayed list;

wherein the data printing unit is configured to print the image data on the printing medium by retrieving the stored image of the image storage medium correlated with the selected one of the owner identifications or the re-use owner identifications; and
wherein the printing device has at least two of a copying function, a facsimile function, a scanning function, and a printing function.

16. The printing device according to claim 15, wherein the access management unit is configured to add or change the owner identifications or the re-use owner identifications.

17. The printing device according to claim 16, wherein the owner identification acquiring unit is configured to acquire a preset owner identification when the owner identifications or the re-use owner identifications will not be acquired, and
wherein the access management unit uses a Web server function to create a Web page configured to set the preset owner identification to allow a client computer, connected to the printing device via the network, to transmit the Web page with the preset owner identification to the access management unit.

18. The printing device according to claim 15, wherein each of the owner identifications or the re-use owner identifications contains at least one of user names and user identifiers.

19. A printing device which has at least two of a copying function, a facsimile function, a scanning function and a printing function and is connected to a file server via a network, the printing device comprising:
a data capturing unit provided in the printing device and configured to capture image data of a document into the printing device;
a data storing unit configured to store the captured image data in an image storage medium of the printing device;
an access management unit configured to correlate owner identifications of users who use the printing device to process the image data, with the stored image data in the image storage medium, to correlate re-use owner identifications of users who are allowed to retrieve or read the stored image data, with the stored image data in the image storage medium, and to allow the stored image data to be accessed when any of the owner identifications or the re-use owner identifications correlated with the stored image data is verified;
a data printing unit configured to print the image data on a printing medium by retrieving the stored image data of the image storage medium when the access to the stored image data is allowed by the access management unit; and
an owner identification acquiring unit configured to acquire the owner identifications or the re-use owner identifications;
wherein the access management unit is configured to store the image data from the data capturing unit into the image storage medium, and to correlate each of the owner identifications or the re-use owner identifications of the owner identification acquiring unit with the stored image data each time the image data is stored in the image storage medium;
wherein the owner identification acquiring unit includes:
- a list displaying unit configured to display, on a display screen, a list of the owner identifications or the re-use owner identifications; and
- a selection input unit configured to select one of the owner identifications or the re-use owner identifications from among the displayed list on the display screen when a corresponding selection button of the display screen is depressed wherein the owner identifications or the re-use owner identifications are acquired in a sequence of selections from the displayed list of the owner identifications or the re-use owner identifications by the selection input unit and one of the owner identifications or the re-use owner identifications acquired in said sequence is selected from among the displayed list;
wherein the data printing unit is configured to print the image data on the printing, medium by retrieving the stored image of the image storage medium correlated with the selected one of the owner identifications or the re-use owner identifications; and
wherein the access management unit is configured to add or change the owner identifications or the re-use owner identifications.

20. The printing device according to claim 19, wherein the owner identification acquiring unit is configured to acquire a preset owner identification when the owner identifications or the re-use owner identifications will not be acquired, and
wherein the access management unit uses a Web server function to create a Web page configured to set the preset owner identification to allow a client computer, connected to the printing device via the network, to transmit the Web page with the preset owner identification to the access management unit.

21. The printing device according to claim 19, wherein each of the owner identifications or the re-use owner identifications contains at least one of user names and user identifiers.

* * * * *